(12) United States Patent
McCree et al.

(10) Patent No.: US 7,643,630 B2
(45) Date of Patent: Jan. 5, 2010

(54) ECHO SUPPRESSION WITH INCREMENT/DECREMENT, QUICK, AND TIME-DELAY COUNTER UPDATING

(75) Inventors: Alan V. McCree, Acton, MA (US);
Takahiro Unno, Richardson, TX (US);
Thierry LeGall, Guipavas (FR);
Sebastien Guiriec, La Colle sur Loup (FR)

(73) Assignee: Texas Instruments Incorporated, Dallas, TX (US)

( * ) Notice: Subject to any disclaimer, the term of this patent is extended or adjusted under 35 U.S.C. 154(b) by 823 days.

(21) Appl. No.: 11/165,897

(22) Filed: Jun. 24, 2005

(65) Prior Publication Data

US 2006/0018458 A1 Jan. 26, 2006

Related U.S. Application Data

(60) Provisional application No. 60/582,953, filed on Jun. 25, 2004.

(51) Int. Cl.
*H04M 9/08* (2006.01)
(52) U.S. Cl. .............................. 379/406.08; 379/406.05
(58) Field of Classification Search ......... 379/338–419; 370/32.1, 99, 121, 110.1, 62, 286; 381/71, 381/94.2
See application file for complete search history.

(56) References Cited

U.S. PATENT DOCUMENTS

| 5,307,405 | A | * | 4/1994 | Sih | 379/406.08 |
|---|---|---|---|---|---|
| 5,687,229 | A | * | 11/1997 | Sih | 379/406.09 |
| 5,920,834 | A | * | 7/1999 | Sih et al. | 704/233 |
| 6,744,886 | B1 | * | 6/2004 | Benesty et al. | 379/406.08 |
| 6,968,064 | B1 | * | 11/2005 | Ning | 381/66 |
| 7,031,269 | B2 | * | 4/2006 | Lee | 370/290 |
| 2002/0044666 | A1 | * | 4/2002 | Eran et al. | 381/66 |

OTHER PUBLICATIONS

Aude Andolfatto, "Implementing an Acoustic Echo Canceller Algorithm using the ST120DSP", 2001, STMicroelectronics, http://www.datasheetcatalog.com.*
C. Breining et al, Acoustic Echo Control, IEEE Signal Processing Magazine 42 (Jul. 1999).
P. Chu, Voice-Activated AGC for Teleconferencing, Proc. IEEE ICASSP 929 (1996).
Dutweiler, Proportionate Normalized Least-Mean-Squares Adaptation in Echo Cancelers, 8 IEEE Tran. Speech Audio Proc. 508 (2000).
J. Shynk, Frequency-Domain and Multirate Adaptive Filtering, IEEE Signal Processing Magazine 14 (Jan. 1992).

* cited by examiner

*Primary Examiner*—Alexander Jamal
(74) *Attorney, Agent, or Firm*—Lawrence J. Bassuk; W. James Brady; Frederick J. Telecky, Jr.

(57) ABSTRACT

Hands-free phones with voice activity detection using a comparison of frame power estimate with an adaptive frame noise power estimate, automatic gain control with fast adaptation and minimal speech distortion, echo cancellation updated in the frequency domain with stepsize optimization and smoothed spectral whitening, and echo suppression with adaptive talking-state transitions.

8 Claims, 7 Drawing Sheets

ECHO SUPPRESSION WITH INCREMENT/DECREMENT, QUICK, AND TIME-DELAY COUNTER UPDATING

CROSS-REFERENCE TO RELATED APPLICATIONS

Priority is claimed from provisional Appl. No. 60/582,953, filed Jun. 25, 2004. The following co-filed US patent applications disclose related subject matter and have a common assignee with the present application: application Ser. Nos. 11/165,902; 11/165,903; and 11/165,898.

BACKGROUND OF THE INVENTION

The present invention relates to signal processing, and more particularly to voice activity detection, automatic gain control, echo cancellation, and echo suppression devices and methods.

Hands-free telephones (e.g., speakerphones) provide conveniences such as conversations while driving an automobile and teleconferencing with multiple speakers at a single phone. However, acoustic reflections of the loudspeaker output of a hands-free phone to its microphone input simulate another participant speaker and thus appear as an echo to the original remote speaker. Acoustic echo cancellation and echo suppression attempt to minimize these effects.

Acoustic echo cancellation methods approximate the properties of the loudspeaker-to-microphone acoustic channel and thereby can generate an approximation of the microphone pickup of sounds emitted by the loudspeaker. Then this approximation can be cancelled from the actual microphone pickup. Acoustic echo cancellation typically uses adaptive filtering to track the varying acoustic channel; see Dutweiler, Proportionate Normalized Least-Mean-Squares Adaptation in Echo Cancelers, 8 IEEE Tran. Speech Audio Proc. 508 (2000).

However, long echo paths (e.g., 400 ms) at high sampling rates (e.g., 16 KHz) leads to filters with a large number of taps (e.g, 6400). This makes the complexity of the filter convolution very high, so frequency domain techniques are often used in these applications; see J. Shynk, Frequency-Domain and Multirate Adaptive Filtering, IEEE Signal Processing Magazine 14 (January 1992). Frequency-domain multiplication is much cheaper than time-domain convolution, and the signals can be efficiently transformed from time domain to frequency domain by Fast Fourier Transforms (FFTs).

Since the Fourier Transform of a long echo path can be too large for practical situations, partitioning the echo canceller filter into smaller subfilters allows the use of shorter transforms; see C. Breining et al, Acoustic Echo Control, IEEE Signal Processing Magazine 42 (July 1999).

Estimation of the echo residual after echo cancellation allows for echo suppression by gain adjustment. Echo suppression may be applied to degrees of full, partial, or half-duplex communications; see ITU-T Recommendation P.340 Transmission Characteristics and Speech Quality Parameters of Hands-free Terminals (May 2000) and ETSI TR 101 110-GSM 3.58 Digital Cellular Telecommunications System: Characterization Test Methods and Quality Assessment for Handsfree Moblie Stations v.8.0.0 (April 2000).

In general, a hands-free phone provides automatic gain control (AGC) to make the loudspeaker output voice level match a user-specified target level. The goal of AGC design is to adjust the voice level as fast as possible while minimizing the output signal distortion (e.g., peak clipping). Also, the AGC should be designed to avoid excessively amplifying background noise (silence intervals). A voice activity detector (VAD) helps the AGC avoid amplifying background noise. The common usage of VAD for the AGC is to adjust the voice level when the VAD decision indicates voiced input (speech intervals) but to leave the gain-scaling unchanged when the VAD decision indicates unvoiced input (silence) intervals). A problem with this method is that the VAD decision error could cause audible distortion in the output speech. An accurate VAD could minimize the decision error, but it may require a complicated algorithm, and in turn, higher computational complexity; see for example, P. Chu, Voice-Activated AGC for Teleconferencing, Proc. IEEE ICASSP 929 (1996).

SUMMARY OF THE INVENTION

The present invention provides echo suppression with adaptive state transitions.

DESCRIPTION OF THE PREFERRED EMBODIMENTS

1. Overview

Figure 2A:
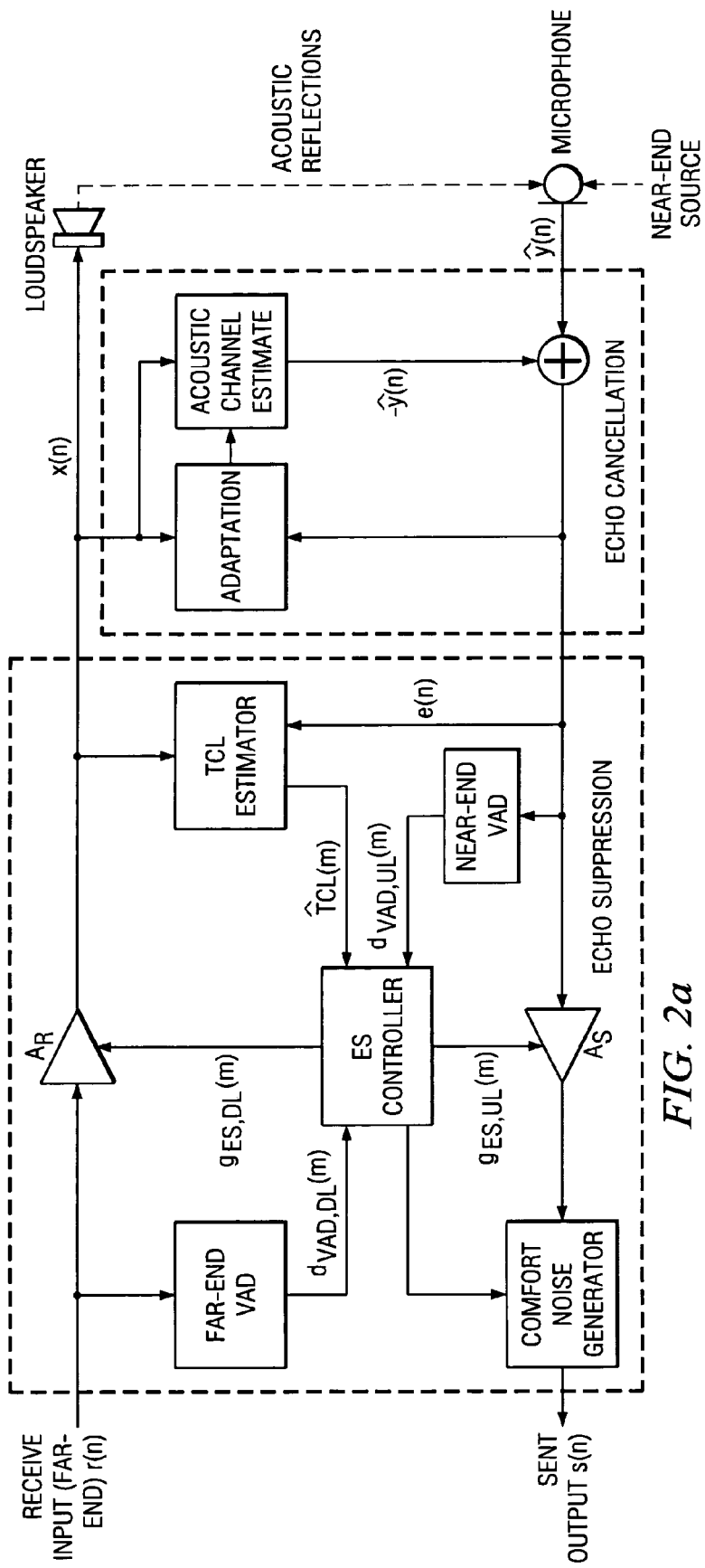
FIG. 2a is block diagram of an echo suppressor system.
Figure 2B:
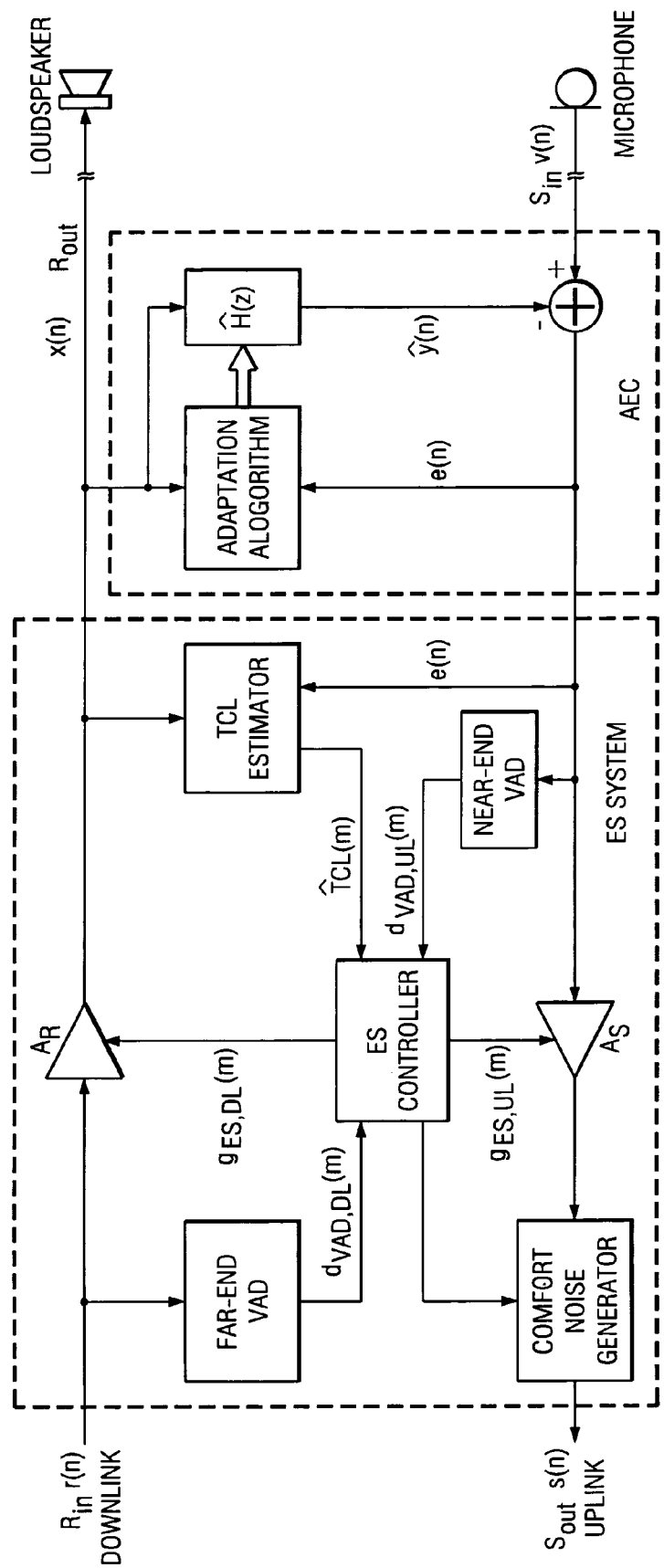
FIG. 2b is a block diagram of another echo suppressor system.

FIGS. 2a-2b illustrate functional blocks of preferred embodiment systems for echo cancellation and echo suppression as could be used in a hands-free phone. In particular, the left-hand edge of FIGS. 2a-2b shows connections to a (wireline or wireless) network for receiving input from a far-end (remote) source and transmitting near-end (local) source output to the far-end; and the right-hand edge shows the loudspeaker and microphone of a hands-free phone plus the phone environment (a near-end source plus an acoustic channel from loudspeaker to microphone). The blocks processes signals digitally and include a right-hand portion for echo cancellation using acoustic channel adaptive estimation and a center plus left-hand portion for echo suppression including gain (attenuation) control for both received ($A_R$) and sent ($A_S$) signals plus (optional) comfort noise generation. Digital-to-analog and analog-to-digital conversions (as in the loudspeaker and microphone) are not explicitly shown; and any digital speech compression-decompression would occur at the left-hand edge for the network transmission-reception and also is not explicitly shown.

Figure 1A:
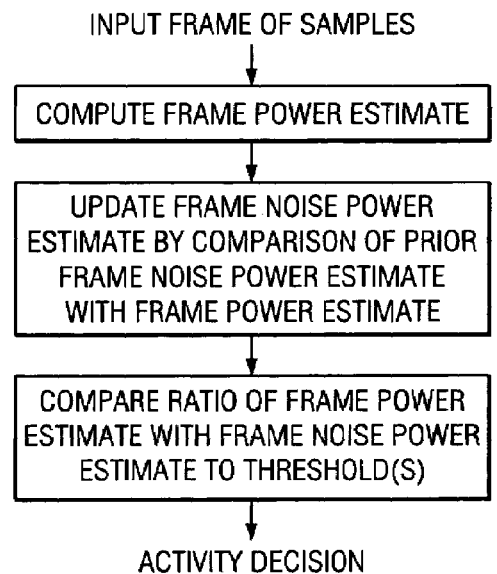
FIG. 1a is a flow chart for voice activity detection.
Figure 5A:
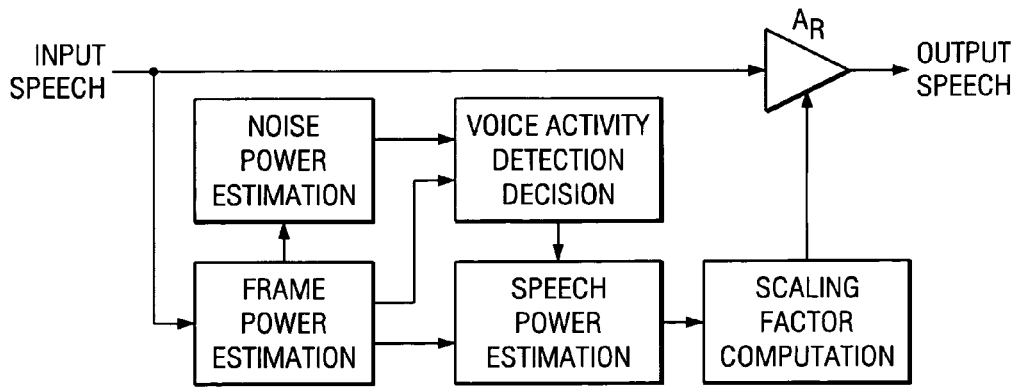
FIG. 5a is a block diagram of an automatic gain control circuit
Figure 5B:
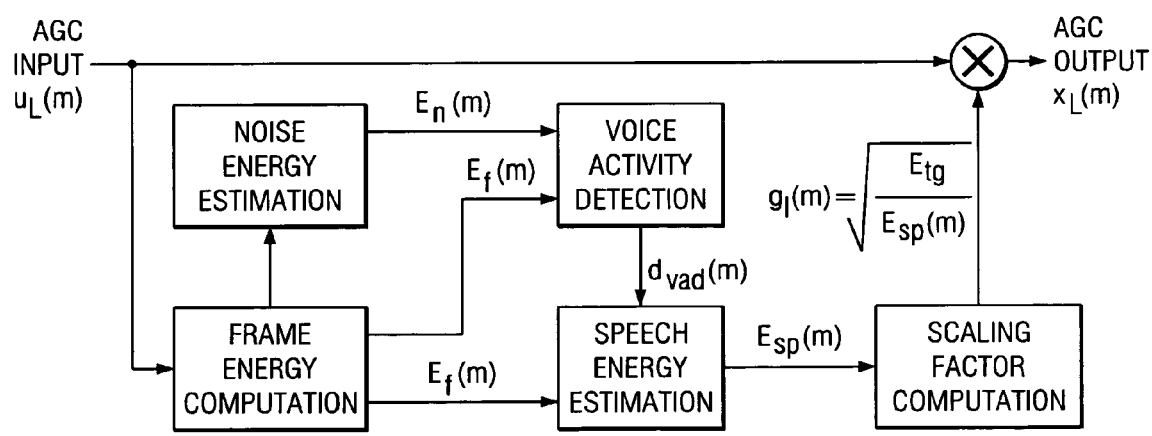
FIG. 5b is a block diagram of another automatic gain control circuit.

A voice activity detector (VAD) provides a decision whether a frame contains speech or silence (or marginal speech activity). FIG. 1a illustrates preferred embodiment VAD decision which compares frame power to an asymmetrically adaptive estimation of frame noise power. This decision is useful both in automatic gain control (AGC) generally as illustrated in FIGS. 5a-5b and as part of echo suppression shown in FIGS. 2a-2b.

Figure 1B:
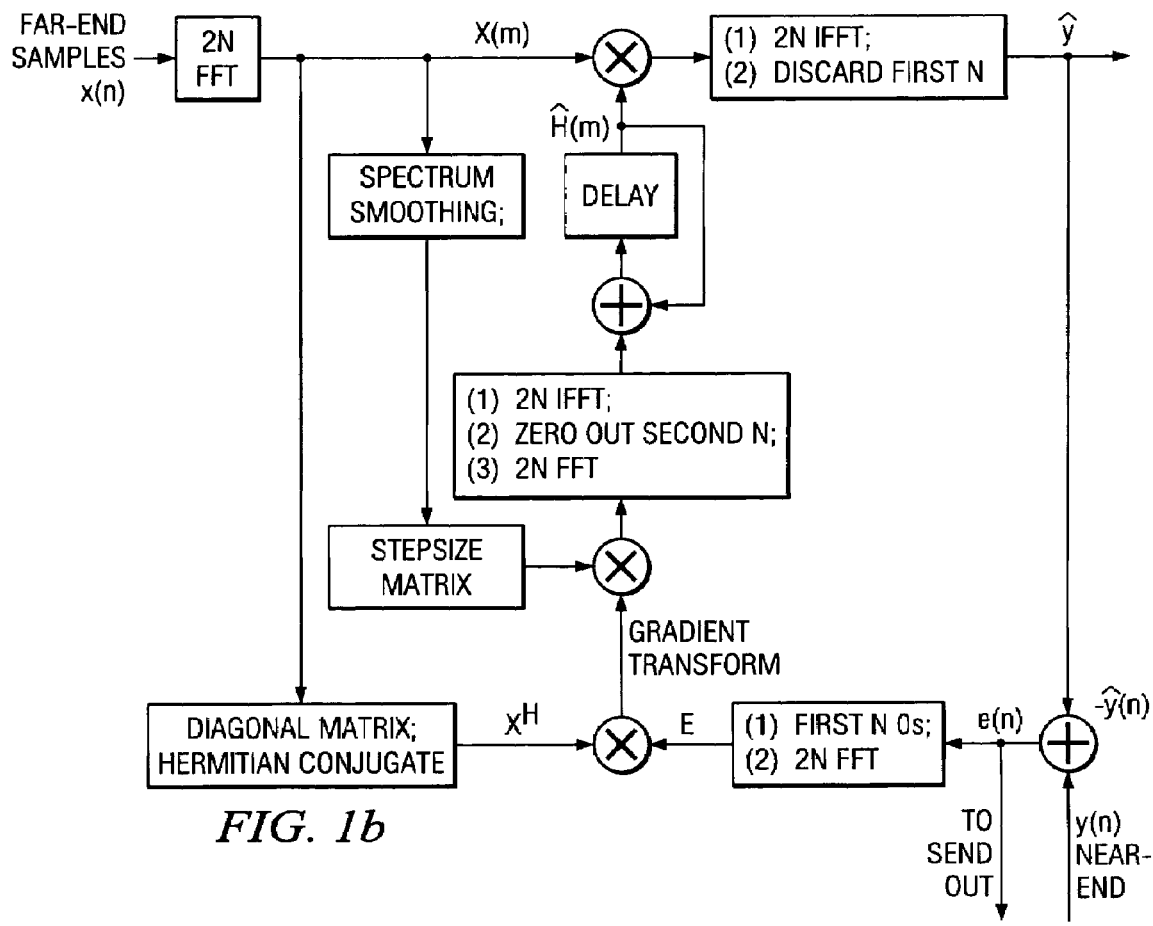
FIG. 1b is a block diagram of an overlap-and-save frequency-domain implementation.
Figure 1C:
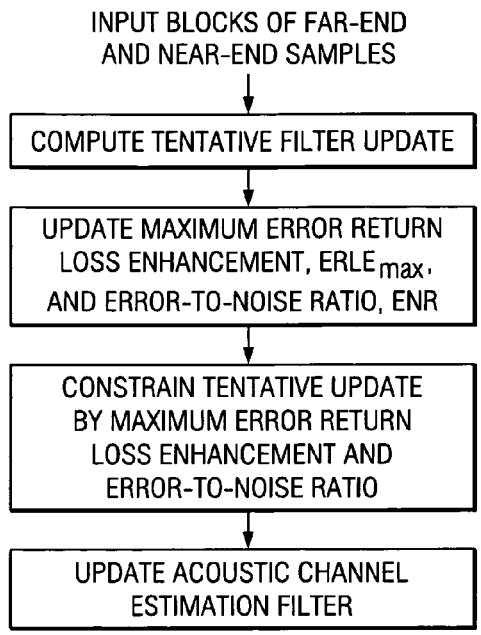
FIG. 1c is a flow chart of adaptive filter updating parameter control.

Preferred embodiment echo cancellation simulates the microphone's pickup of the loudspeaker output by estimating the corresponding acoustic channel by an adaptive filter with one or more of the features of (i) an optimal adaptation stepsize, (ii) frequency-domain adaptation computations including smoothed spectral whitening, (iii) adaptation stepsize control according to filter misadjustment and frame echo-to-noise, and (iv) the filter partitioned into subfilters with frequency-domain adaptation stepsizes proportional to subfilter energies. FIG. 1b shows an overlap-and-save frequency-domain implementation, and FIG. 1c illustrates adaptive filter updating parameter control.

Figure 1D:
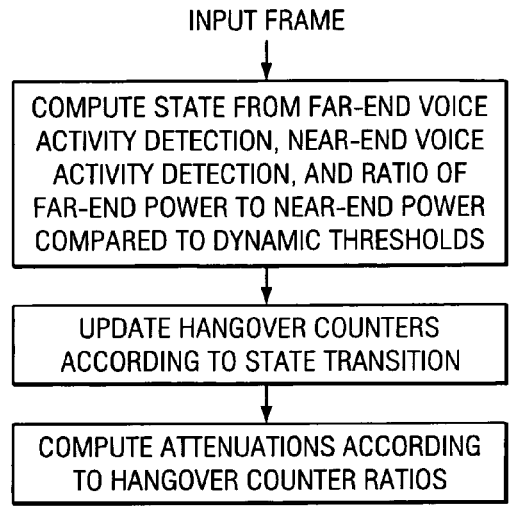
FIG. 1d is a flow chart of echo suppression.
Figure 1E:
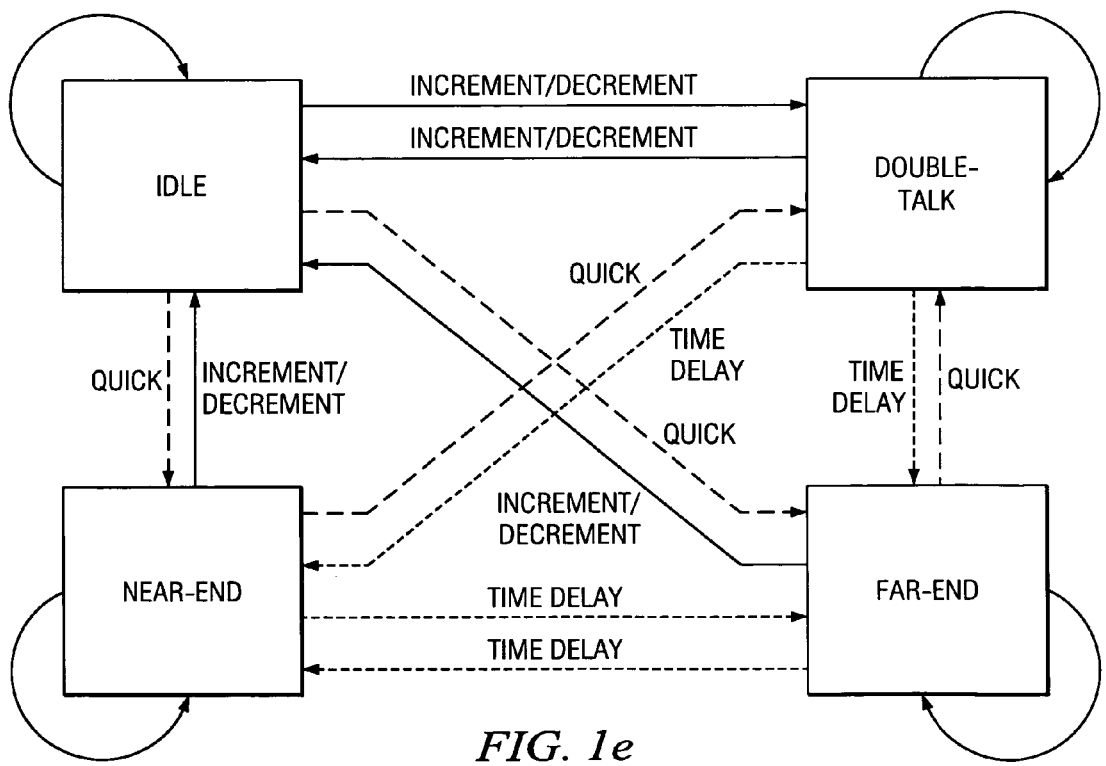
FIG. 1e is a state diagram.

FIG. 1d is an echo suppression flow diagram, and FIG. 1e indicates preferred embodiment echo suppression state transitions.

The preferred embodiment methods can be performed with digital signal processors (DSPs) or general purpose programmable processors or application specific circuitry or systems on a chip such as both a DSP and RISC processor on the same chip with the RISC processor controlling. A stored program in an onboard ROM or external flash EEPROM for a DSP or programmable processor could perform the signal processing. Analog-to-digital converters and digital-to-analog converters provide coupling to the real world, and modulators and demodulators (plus antennas for air interfaces) provide coupling for transmission waveforms. The speech can be encoded, packetized, and transmitted over networks such as the Internet.

2. Voice Activity Detector

Figure 3:
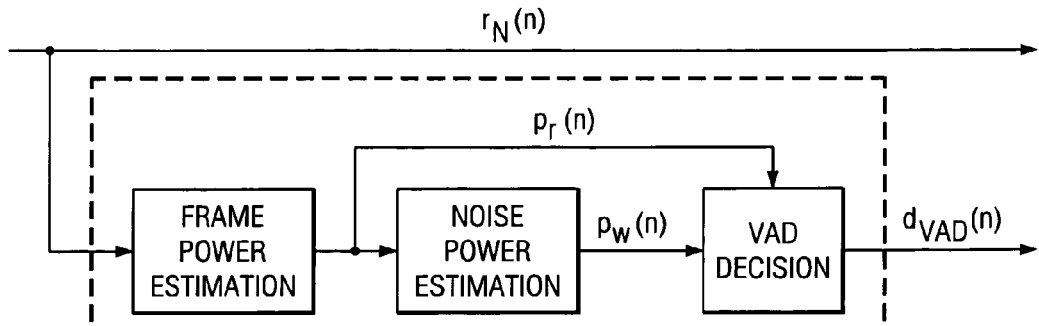
FIG. 3 is a block diagram of a voice activity detector.

FIG. 3 illustrates a preferred embodiment voice activity detector (VAD) utilizing a ratio of noise power and frame power estimations. This VAD may used in the preferred embodiment echo suppression of FIGS. 2a-2b and also in the preferred embodiment automatic gain control (AGC) for a digital speech system shown in FIGS. 5a-5b. FIG. 1a illustrates the VAD operation, as follows.

First, presume a sampling interval of T, so time t is expressed as integer n with $t=t_0+nT$ where $t_0$ is an initial time. Let $r(n)$ be the input sample at time n and $r_N(n)$ denote the VAD observation vector; that is, at time n the last N samples:

$$r_N(n) = \begin{bmatrix} r(n) \\ \vdots \\ r(n-k) \\ \vdots \\ r(n-N+1) \end{bmatrix}$$

For example, N=160 would correspond to the number of samples in one 20 ms frame at a 8 KHz sampling rate or in one 10 ms frame at a 16 KHz sampling rate. The digital data may be 16-bit floating point or fixed-point of a convenient size.

Next, for frame time m (the time $t_0+mNT$ at the start of the mth frame) define the frame power estimate, $p_r(m)$, as the average sample energy over the last N samples:

$$p_r(m) = 1/N \Sigma_{0 \leq k \leq N-1} r^2(mN-k)$$

Similarly, define the frame background (white) noise power estimate, $p_w(m)$, with an adaptive estimate of the minimum energy level of the current frame energy. The noise power estimation uses an asymmetrical gain which decreases more quickly than it increases. For example, decrease at −24 dB/s and increase at +3 dB/s. This allows the VAD to be reactive when a speech frame occurs while the VAD is less reactive during the speech frame itself. In particular, let $P_w^0$ define a frame noise power floor, and initialize the frame noise power estimate by $p_w(0)=P_w^0$. Then for the first few frames (a learning period) take $p_w(m)=p_r(m)$; the learning period could be 4 frames. Thereafter the noise power estimate adapts to the current frame power estimate, $p_r(m)$:

$$p_w(m) = \begin{cases} \gamma^d p_w(m-1) & \text{if } p_r(m) < \gamma^d p_w(m-1) \\ \gamma^u p_w(m-1) & \text{if } p_r(m) > \gamma^u p_w(m-1) \\ p_r(m) & \text{otherwise} \end{cases}$$

where $\gamma^d$ and $\gamma^u$ are the decreasing (down) and increasing (up) adaptation factors, respectively. And ensure that the noise estimate does fall below the noise floor by taking $p_w(m)=\max\{p_w(m), P_w^0\}$ Exemplary values are $\gamma^d=0.895$ (so with 20 ms frames a decrease of −24 dB/s) and $\gamma^u=1.014$ (again with 20 ms frames an increase of 3 dB/s).

Lastly, when the ratio of the current frame power estimate to the current frame noise power estimate exceeds a threshold, the VAD outputs a decision that the current frame contains speech; otherwise it does not. To increase the VAD decision reliability, another preferred embodiment method provides a three-state decision: "inactive", "marginally active", or "strongly active". In more detail: define decision thresholds $\tau_{VAD,1}$ and $\tau_{VAD,2}$; then the VAD decision, $d_{VAD}(m)$, that the mth frame is given by:

$$d_{VAD}(m) = \begin{cases} 0 & \text{if } p_r(m)/p_w(m) < \tau_{VAD,1} \\ 1 & \text{if } \tau_{VAD,1} \leq p_r(m)/p_w(m) \leq \tau_{VAD,2} \\ 2 & \text{if } \tau_{VAD,2} < p_r(m)/p_w(m) \end{cases}$$

with the coding: 0 is "inactive", 1 is "marginally active", and 2 is "strongly active". Of course, the VAD preferred embodiment with only two-state decisions uses only one threshold; this amounts to taking $\tau_{VAD,2} \to \infty$ (i.e., using only $\tau_{VAD,1}$).

Figure 4:
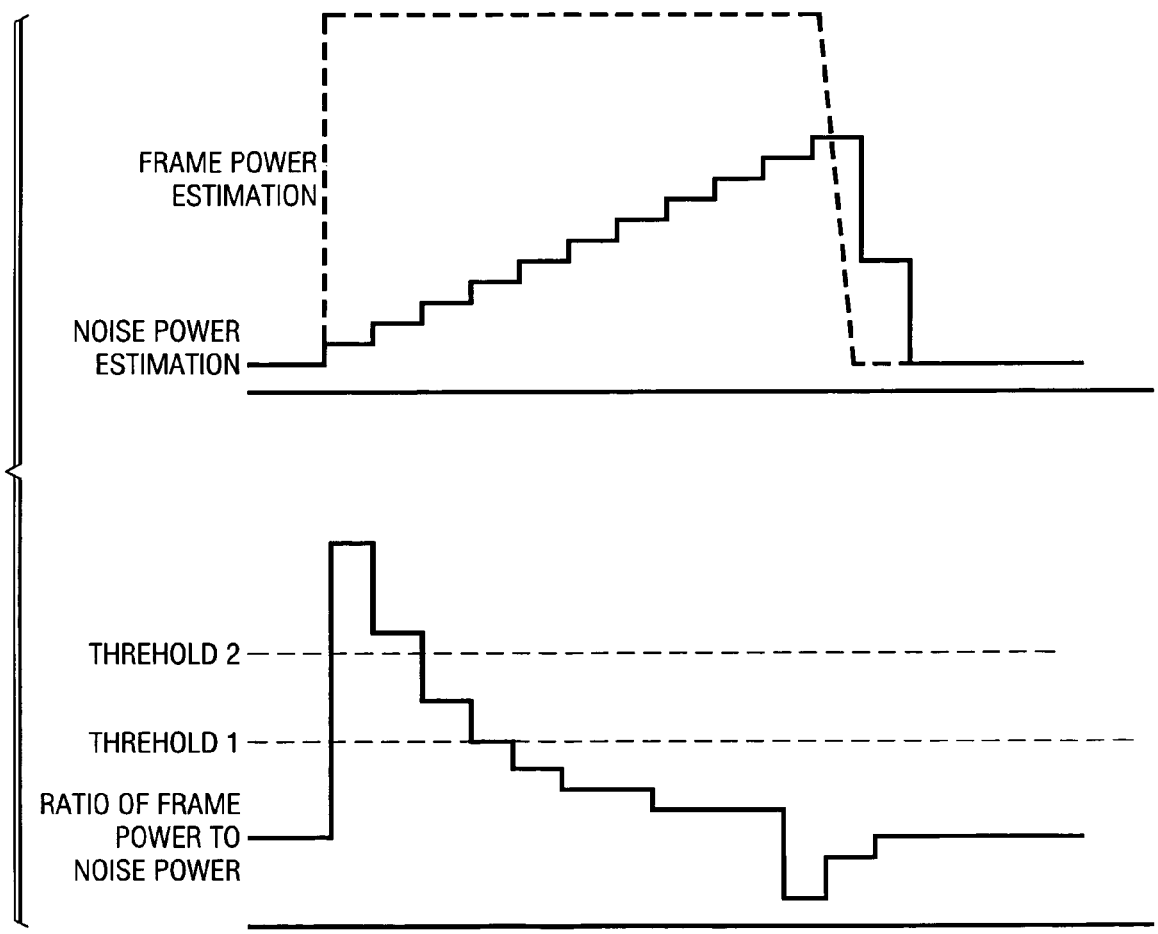
FIG. 4 is a chart of frame and noise power.

Practical values for the thresholds could be $\tau_{VAD,1}=4$ and $\tau_{VAD,2}=16$. FIG. 4 illustrates an example of the noise power (log scale) estimation as it tracks input frame power, and FIG. 1a is a flow diagram.

3. Automatic Gain Control

Figure 6:
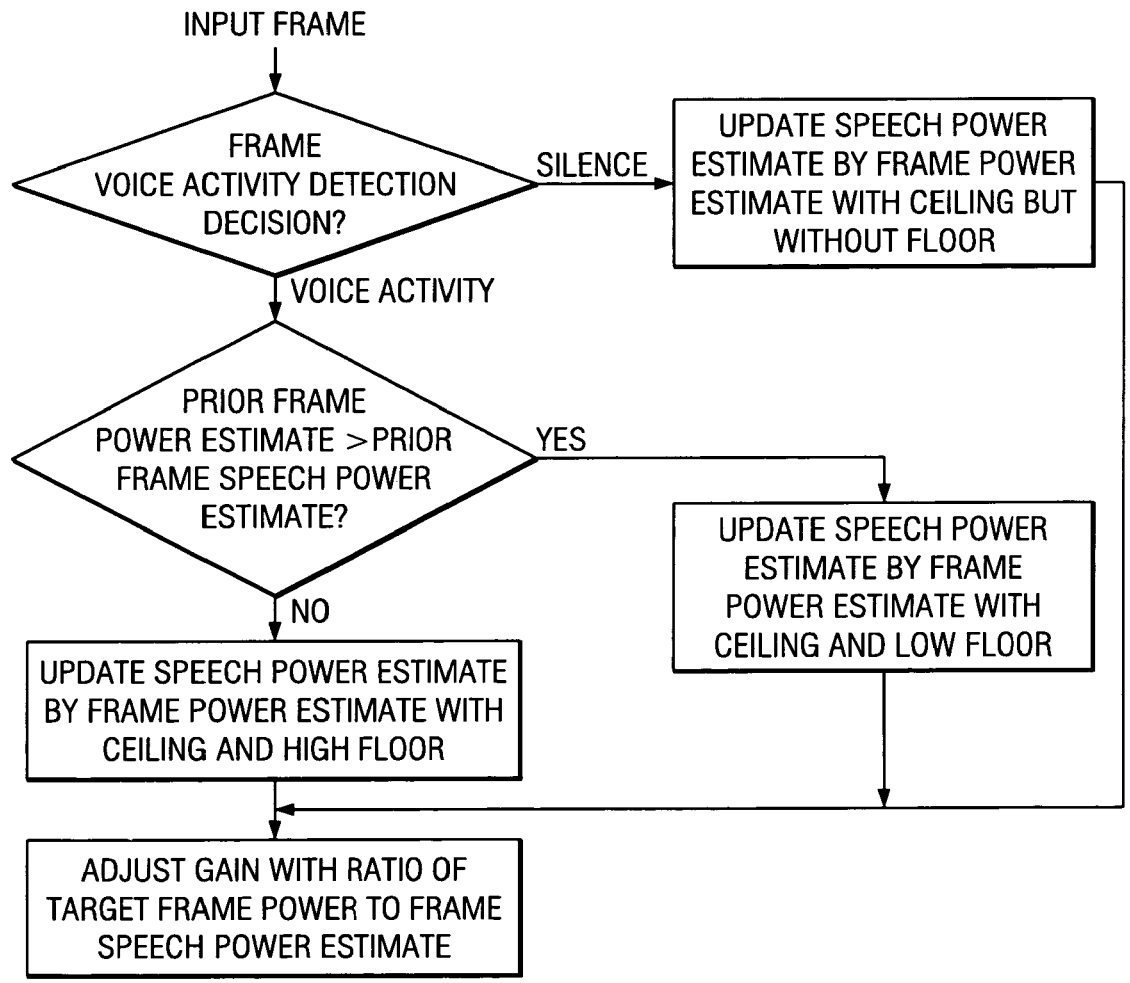
FIG. 6 is a flow chart for automatic gain control.

The FIGS. 5a-5b scaling factor computation to set the amplification for automatic gain control (AGC) includes adaptive speech power estimation, $p_{sp}(m)$, for the mth frame analogous to the noise power estimation of the VAD. In particular, set the amplification for the mth frame to $\sqrt{(p_{tg}(m)/p_{sp}(m))}$ where $p_{tg}(m)$ is the target power level and $p_{sp}(m)$ is computed with following steps illustrated in FIG. 6.

(1) check whether the VAD had made a decision of speech activity (not silence) for any of frames 0 to m; note that this VAD has only one threshold and two possible decisions: speech activity or silence.

(2) if step (1) shows there is no prior frame VAD decision of speech activity, then use the initialization value for $p_{sp}(m)$; that is, $p_{sp}(m)=p_{sp}(0)$. Note that the initial speech power estimation is taken to have a large value, such as $10^7$.

(3) if step (1) shows a prior frame VAD decision of speech activity, check whether the VAD has made a decision of speech activity for the mth (current) frame.

(4) if step (3) shows a current frame VAD decision of speech activity, then pick the decrease constant, $c^d$, according to whether the speech power estimation, $p_{sp}$ (k), was smaller than the frame power estimation, $p_r(k)$, for some previous frame k: if the speech power estimation had never been smaller than the frame power estimation, then take a smaller constant (e.g., 0.9772) for faster gain adjustment; whereas, if the speech power estimation had previously been equal to or smaller than the frame power estimation, take a larger constant (e.g., 0.9977) for slow downward and less distortion in the output.

(5) with the current frame VAD decision of speech activity, the speech power is controlled with asymmetric adaptation constants: a larger increase constant, $c^u$, and a smaller decrease constant, $c^d$, by:

$$p_{sp}(m) = \begin{cases} c^u p_{sp}(m-1) & \text{if } p_r(m) > c^u p_{sp}(m-1) \\ c^d p_{sp}(m-1) & \text{if } p_r(m) < c^d p_{sp}(m-1) \\ p_r(m) & \text{otherwise} \end{cases}$$

Practical values for 20 ms frames are $c^u$=31.622 (15 dB) and $c^d$=0.9772 (−0.1 dB) or 0.9977 (−0.01 dB) as noted in step (4). Preferred embodiments take the values of the constants to lie in ranges, such as 10 dB<$c^u$<20 dB and −0.2 dB<$c^d$<−0.005 dB.

(6) with a current frame VAD decision of silence, the speech power is controlled with the increase adaptation constant, $c^u$, only:

$$p_{sp}(m) = \begin{cases} c^u p_{sp}(m-1) & \text{if } p_r(m) > c^u p_{sp}(m-1) \\ p_{sp}(m-1) & \text{if } p_r(m) < p_{sp}(m-1) \\ p_r(m) & \text{otherwise} \end{cases}$$

Use the same increase constant $c^u$=−31.622 (15 dB).

In step (4) the use of two different downward time constants contributes to the fast gain adjustment with minimal output speech distortion. It is necessary to set the initial speech power to a large number in order to avoid excessively amplifying the input signal at the beginning. It makes the gain adjustment faster to use the faster downward time constant until the estimated speech power comes down to the actual frame power level from the high initial level. Then, when the estimated speech power gets to the same level as the frame power, the downward time constant is switched to the slower constant to minimize the output speech distortion.

The use of the VAD decision in steps (5) and (6) makes the AGC robust to the VAD decision error and allows the AGC to use a simple VAD method instead of an accurate VAD requiring higher computational complexity. The VAD decision (the knowledge of whether the input frame is speech or silence) allows the AGC to avoid excessive amplification of a silence frame. However, the VAD decision error could cause the AGC to adjust the scaling factor in the wrong way for the speech or silence frame. In the preferred embodiment AGC, even if the VAD classifies a silence frame as containing speech activity by mistake, the slow downward constant in step (5) does not allow the estimated speech power to go down too quickly (i.e., not allow the scaling factor to go up too quickly), and this avoids excessive amplification of the silence frame. On the other hand, even if the VAD classifies a frame containing speech as a silence frame by mistake, the estimated speech power is still allowed to move upward with the fast time constant instead of remaining unchanged as described in step (6). This allows the AGC to adjust the scaling factor to an appropriate level in the speech onset and to avoid peak clipping of the signal.

4. Echo Cancellation

A first preferred embodiment echo canceller, as could be part of the system of FIGS. 2a-2b, uses a variant of the block LMS (least mean squares) method for adaptive updating of the acoustic channel estimation. In particular, let x(n) denote the received far-end speech signal applied to the loudspeaker, let $h_n(k)$ be the impulse response of the acoustic channel from loudspeaker to microphone (including digital-analog and analog-digital conversions) at time n, and let y(n) be the microphone output signal. Thus, $$y(n) = v(n) + \Sigma_{0 \leq k < \infty} h_n(k) x(n-k)$$

where v(n) denotes any near-end speech plus noise picked up by the microphone in addition to the far-end speech x(n) broadcast from the loudspeaker and propagated through the acoustic channel. Then using a length N estimate, $\hat{h}_n(k)$, of the acoustic channel impulse response, compute an estimate of the loudspeaker output picked up by the microphone, ŷ(n), as the filter response (a convolution computation):

$$\hat{y}(n) = \Sigma_{0 \leq k \leq N-1} \hat{h}_n(k) x(n-k)$$

and cancel the estimate from y(n) to yield an error signal e(n)=y(n)−ŷ(n). Of course, e(n) is just the sum of any near-end noise and speech, v(n), plus the result of inaccuracies in the acoustic channel estimation filtering the far-end input, $\Sigma_{0 \leq k < \infty}[h_n(k) - \hat{h}_n(k)] x(n-k)$. These two sources should be uncorrelated and thus LMS methods apply to filter coefficient determination.

The LMS method adaptively updates the time-dependent filter $\hat{h}_n(k)$ from the current error signal, the corresponding prior far-end speech samples, and an adaptation parameter. In particular, adapt by minimizing the expected e(n)² for random inputs by a steepest-descent method which computes the gradient with respect to the filter components as variables ($\partial(e(n)^2)/\partial \hat{h}_j(k) = -2e(n)x(n-k)$) and updates accordingly:

$$\hat{h}_{n+1}(k) = \hat{h}_n(k) + \mu(n) e(n) x(n-k)$$

where μ(n) is the positive "stepsize" parameter which scales the gradient and which determines update convergence rate and filter stability. The optimal convergence rate (μ=2) does not suppress filter instabilities, and common practice takes μ=0.1.

The block LMS method only updates the acoustic channel estimation filter after each block of L samples of x(n); that is, the L updates are accumulated over the block and then applied:

$$\hat{h}_{mL+L}(k) = \hat{h}_{mL}(k) + \mu(mL) \Sigma_{0 \leq j \leq L-1} e(mL+j) x(mL+j-k)$$

where e(mL+j)=y(mL+j)−ŷ(mL+j) with ŷ(mL+j) computed using the same (updated-only-once-per-block) filter $\hat{h}_{mL}(.)$ for the entire block: j=0, 1, ..., L−1.

Typical filter lengths for acoustic channels of a hands-free phone in an automobile would be N=100-300 (e.g., 32 ms reverberation paths at 8 KHz implies 256 filter taps), and acoustic channels in offices or conference rooms would have N roughly five to ten times as large. And taking the block size equal to the filter length is computationally convenient and common. However, some preferred embodiments use a block size such as L=160 (e.g., 20 ms digital speech frame at 8 KHz sampling rate) for synchronizing filter updating with a frame decoding. Further preferred embodiments partition a filter into smaller subfilters to have the subfilter length and block size both comparable to a discrete Fourier transform size; see subsection (d) below.

In N-vector notation the estimated acoustic channel filtering is:

$$\hat{y}(mL+j) = \langle \hat{h}_{mL} | x(mL+j) \rangle$$

where $\langle | \rangle$ denotes inner (scalar) product of two N-vectors, j is the relative time variable within a block, $\hat{h}_{mL}$ is the N-vector of filter coefficients at time mL which is the start of the mth block, and $x(mL+j)$ is the N-vector of prior far-end samples filtered at time $mL+j$ to estimate the echo; that is, $$\hat{h}_{mL} = \begin{bmatrix} \hat{h}_{mL}(0) \\ \hat{h}_{mL}(1) \\ \hat{h}_{mL}(2) \\ \vdots \\ \hat{h}_{mL}(N-1) \end{bmatrix}$$

$$x(mL+j) = \begin{bmatrix} x(mL+j) \\ x(mL+j-1) \\ x(mL+j-2) \\ \vdots \\ x(mL+j-(N-1)) \end{bmatrix}$$

The block LMS method filter update is then written:

$$\hat{h}_{mL+L} = \hat{h}_{mL} + \mu(mL)\Sigma_{0 \le j \le L-1} e(mL+j)x(mL+j)$$
$$= \hat{h}_{mL} + \mu(mL)\hat{h}_{\Delta,mL}$$

where $\hat{h}_{\Delta,mL} = \Sigma_{0 \le j \le L-1} e(mL+j)x(mL+j)$ is the negative gradient for a block.

(a) Optimal Step-Size

Various methods for controlling the stepsize, $\mu(n)$, exist. For example, a correlation between loudspeaker input $x(n)$ and microphone pick up $y(n)$ can be used to control stepsize by presuming a high correlation corresponds to only far-end speech and thus ideally large stepsize for fast adaptation, whereas a small correlation corresponds to both far-end and near-end speech and so adaptation is not feasible and thus a small stepsize.

In contrast, some preferred embodiment update methods compute an optimal stepsize by minimizing the error $e(mL+L+j)$ over its block: $j=0, 1, \ldots, L-1$. In particular, the error signal in block $m+1$ is:

$$e(mL+L+j) = y(mL+L+j) - \hat{y}(mL+L+j)$$
$$= y(mL+L+j) - \langle \hat{h}_{mL,L} | x(mL+L+j) \rangle$$
$$= y(mL+L+j) - \langle \hat{h}_{mL} + \mu(mL)\hat{h}_{\Delta,mL} | x(mL+L+j) \rangle$$
$$= y(mL+L+j) - \langle \hat{h}_{mL} | x(mL+L+j) \rangle -$$
$$\mu(mL)\langle \hat{h}_{\Delta,mL} | x(mL+L+j) \rangle$$
$$= e_{old}(mL+L+j) - \mu(mL)e_{\Delta}(mL+L+j)$$

where $e_{old}(mL+L+j) = y(mL+L+j) - \langle \hat{h}_{mL} | x(mL+L+j) \rangle = y(mL+L+j) - \hat{y}_{old}(mL+L+j)$ is the error computed using the (old) filter coefficients of prior block m for the estimated cancellation, and $$e_{\Delta}(mL+L+j) = \langle \hat{h}_{\Delta,mL} | x(mL+L+j) \rangle$$
$$= \Sigma_{0 \le k \le L-1} e(mL+k)\langle x(mL+k) | x(mL+L+j) \rangle$$

is an output computed using the (old) gradient of prior block m. Note that the filtering (inner product) computations are convolutions-correlations, and some preferred embodiments will lessen the computational load by use of a discrete Fourier transform to replace the convolutions-correlations with frequency-domain multiplications; see subsection (d) below.

Now the error signals for a block form an L-vector:

$$e(mL) = \begin{bmatrix} e(mL) \\ e(mL+1) \\ e(mL+2) \\ \vdots \\ e(mL+L-1) \end{bmatrix}$$

with analogous definitions for the L-vectors $e_{old}(mL)$ and $e_{\Delta}(mL)$. Thus in terms of the norms of these L-vectors:

$$\|e(mL+L)\|^2 = \sum_{0 \le j \le L-1} e(mL+L+j)^2$$
$$= \sum_{0 \le j \le L-1} [e_{old}(mL+L+j) - \mu(mL)e_{\Delta}(mL+L+j)]^2$$
$$= \|e_{old}(mL+L) - \mu(mL)e_{\Delta}(mL+L)\|^2$$
$$= \|e_{old}(mL+L)\|^2 - 2\mu(mL)\langle e_{old}(mL+L) |$$
$$e_{\Delta}(mL+L) \rangle + \mu(mL)^2 \|e_{\Delta}(mL+L)\|^2$$

Then minimizing this quadratic with respect to $\mu(mL)$ yields a first preferred embodiment optimal stepsize, $\mu_{opt}(mL)$, which is used for the filter updating.

$$\mu_{opt}(mL) = \langle e_{old}(mL+L) | e_{\Delta}(mL+L) \rangle / \|e_{\Delta}(mL+L)\|^2$$

This optimal stepsize roughly reflects the ratio $\|\hat{h}_{mL}\|/\|\hat{h}_{\Delta,mL}\|$ and thus intuitively adapts to the channel estimation accuracy in the sense that a large ratio of filter to gradient indicates stability and thus a large stepsize may be used, whereas a small ratio of filter to gradient suggests instability and thus a small stepsize should be used. Various preferred embodiments control the size of the filter change by modifying the stepsize, including this optimal; see the following subsections (c) and (d).

An alternative preferred embodiment uses the updating of the filter to reestimate the echo. That is, optimize the stepsize by minimizing the error using the gradient defined from the initial echo estimate, and then update the filter and reestimate the echo. In particular, for $e_{\Delta}(mL+L+j)$ use the gradient defined by $e_{old}(mL+L+j)$ and $x(mL+L+j)$. Thus, $$\mu_{opt}(mL+L) = \langle e_{old}(mL+L) | e_{\Delta}(mL+L) \rangle / \|e_{\Delta}(mL+L)\|^2$$

where $$e_{old}(mL+L+j)=y(mL+L+j)-<\hat{h}_{mL}|x(mL+L+j)>$$

$$e_\Delta(mL+L+j)=<\hat{h}_{\Delta,mL+L}|x(mL+L+j)>$$

with $$\hat{h}_{\Delta,mL+L}=\Sigma_{0\le k\le L-1}e_{old}(mL+L+k)x(mL+L+k)$$

Then the filter update is:

$$\hat{h}_{mL+L}=\hat{h}_{mL}+\mu_{opt}(mL+L)\hat{h}_{\Delta,mL+L}$$

and use this updated filter to reestimate the echo and echo-cancelled output (error).

In other words, for frame m+1 the initial estimate for the acoustic channel is $\hat{h}_{mL}$ from frame m; and the initial echo estimate for frame m+1 loudspeaker input x(mL+L+j) is $\hat{y}_{old}$(mL+L+j)=<$\hat{h}_{mL}$|x(mL+L+j)>. So the initial error estimate is $e_{old}$(mL+L+j)=y(mL+L+j)−$\hat{y}_{old}$(mL+L+j). Next, compute the gradient $\hat{h}_{\Delta,mL+L}$ from this initial error estimate together with the loudspeaker input. Then compute $e_\Delta$(mL+L+j) and the optimal stepsize $\mu_{opt}$(mL+L). Lastly, update the filter to $\hat{h}_{mL+L}$ and reestimate the echo as $\hat{y}$(mL+L+j)=<$\hat{h}_{mL+L}$|x(mL+L+j)> and thus reestimate the error as e(mL+L+j)=y(mL+L+j)−$\hat{y}$(mL+L+j) which, of course, is equivalent to an update with the already-computed −$\mu_{opt}$(mL+L) $e_\Delta$(mL+L+j):

$$e(mL+L+j)=e_{old}(mL+L+j)-\mu_{opt}(mL+L)e_\Delta(mL+L+j)$$

(b) Maximum Relative Stepsize

Convergence of the adaptive filter is based on the assumption that the only near-end input signal is the echo of the loudspeaker output propagating through the acoustic channel; if there is acoustic noise or the near-end speaker is talking, then the echo cancellation filter can quickly diverge. In a traditional double-talk detector, the energy of the near-end and the far-end signals are compared, and if the near-end energy is too high, then adaptation of the filter is stopped and the filter coefficients are frozen. However, in difficult acoustic echo situations the echo can be so loud as to stop the adaptation, paralyzing the system. In addition, convergence enhancements such as spectral whitening as in forgoing subsection (c) can magnify near-end noise in quiet frequency bands, distorting the estimation process even when the echo appears to be the dominant signal.

To prevent divergence in the presence of near-end signals, some preferred embodiments monitor the amount of filter adaptation per input block and limit the amount of change based on the current echo cancellation state. The filter change is defined by the energy in the filter update normalized by the energy in the current filter; namely, for the mth block define the relative change:

$$\Delta_{mL}=\|\mu(mL)\hat{h}_{\Delta,mL}\|^2/\|\hat{h}_{mL}\|^2$$

During periods of strong near-end energy, the filter estimate can diverge quickly, which is reflected in large values of $\Delta_{mL}$. Some preferred embodiments limit $\Delta_{mL}$ to a maximum value of $\Delta_{max}$ by scaling down μ(mL) for blocks where this limit would be exceeded. This ensures that any divergence of the filter will be very slow. In particular, for the update $\hat{h}_{mL+L}=\hat{h}_{mL}+\mu(mL)\hat{h}_{\Delta,mL}$ (where μ(mL) may be equal to $\mu_{opt}$(mL) or may be determine in some other manner) a preferred embodiment replaces μ(mL) with min[μ(mL), $\sqrt{\Delta_{max}}\|\hat{h}_{mL}\|/\|\hat{h}_{\Delta mL}\|$].

Note that the absolute magnitude of the filter change, $\|\mu(mL)\hat{h}_{\Delta mL}\|$, can also be controlled as well as this relative magnitude change, but such control requires assumptions about the magnitude of the actual echo response. The limit $\Delta_{max}$ can be fixed, for example, at −20 dB, or adaptive as described in subsection (c) below. When combined with a very conservative energy detector to freeze adaptation in obvious near-end speech conditions, this stepsize control provides good protection against divergence of the filter.

(c) Adaptive Control of Stepsize

While control of stepsize provides robustness against divergence of the filter estimate, it can also degrade the ability of the echo canceller to adapt to true changes in the acoustic channel. (The control also extends to the spectral whitening described in the following subsections.) Therefore, preferred embodiment methods adaptively control the relative filter change limit, $\Delta_{max}$ (and the spectral whitening noise floor, NF). The control is based on continuously adaptive estimates of two parameters: the current convergence of the acoustic channel estimate (as measured by the maximum echo return loss enhancement, $ERLE_{max}$, over recent blocks) and the amount of near-end signal in the current block (echo to near-end noise ratio, ENR). Indeed, define the echo return loss enhancement as ERLE(mL)=10 $\log_{10}$ {$\|y(mL)\|^2/\|e(mL)\|^2$}, and track the maximum ERLE with a nonlinear estimator that increases faster than it decreases, providing a measure of currently achievable performance. A preferred embodiment simple example:

$$ERLE_{max}(mL)=(1-\lambda)ERLE_{max}(mL-1)+\lambda ERLE(mL)$$

where λ=0.7 if ERLE(mL)>$ERLE_{max}$(mL−1) and λ=0.02 otherwise. Preferred embodiments take λ for increases in the range 0.4-0.9 and for decreases in the range 0.01-0.05. Typical values of $ERLE_{max}$ (quiet near-end) could be 20 dB to 60 dB. Use this estimate of $ERLE_{max}$ to estimate the ENR for each block as follows.

First, interpret the near-end input (microphone output) signal, y(n), as a combination of an echo, echo(n) (=h⊗x(n)), and noise, v(n). Thus the echo canceller output, e(n), will be the near-end input, y(n), minus the echo estimate, $echo_{est}$(n) (=$\hat{y}$(n)):

$$y(n) = echo(n) + v(n)$$
$$e(n) = y(n) - echo_{est}(n)$$
$$= echo(n) - echo_{est}(n) + v(n)$$

Now if (i) the noise and the echo are independent, (ii) the noise and the echo estimates are independent, and (iii) the block-length correlation estimates for independent signals are zero, then the energies can be computed as:

$$\|y(mL)\|^2 = \|echo(mL)\|^2 + \langle echo(mL) | v(mL)\rangle + \|v(mL)\|^2$$
$$= \|echo(mL)\|^2 + \|v(mL)\|^2$$
$$\|e(mL)\|^2 = \|echo(mL) - echo_{est}(mL)\|^2 + \langle echo(mL) - echo_{est}(mL) | v(mL)\rangle + \|v(mL)\|^2$$
$$= \|echo(mL) - echo_{est}(mL)\|^2 + \|v(mL)\|^2$$

where the L-vectors are the signal samples in the mth block.

Next, let g denote the near-end signal attenuation (echo-return loss enhancement, ERLE) resulting from the current echo canceller for this noisy input block; that is, $g^2=\|e(mL)\|^2/\|y(mL)\|^2$. Further, define $g_m$ as the expected attenuation of the echo only (excluding noise) resulting from the current cancellation (using the echo filter estimate); that is, the current filter misadjustment error:

$$g_m^2 = \|\text{echo}(mL) - \text{echo}_{est}(mL)\|^2 / \|\text{echo}(mL)\|^2.$$

Approximate $g_m$ using $\text{ERLE}_{max}$ because recent blocks with no near-end noise will have attained the maximum ERLE, and $\text{ERLE}_{max}$ only slowly decays. Combining the foregoing equations and solving for the echo-to-noise ratio, ENR:

$$ENR = \|\text{echo}(mL)\|^2 / \|v(mL)\|^2$$
$$= (1 - g^2)/(g^2 - g_m^2)$$

Measurement of the microphone output $\|y(mL)\|$ and the echo canceller output $\|e(mL)\|$ gives $g$ and thus ERLE ($=-10 \log_{10} g^2$), tracking ERLE gives $\text{ERLE}_{max}$ and thus, presumptively, $g_m$ ($\text{ERLE}_{max} = -10 \log_{10} g_m^2$), so ENR can be computed with little overhead.

The preferred embodiment control methods use $\text{ERLE}_{max}$ and ENR to adjust the maximum filter change, $\Delta_{max}$. Thus presume that $\text{ERLE}_{max}$ provides an approximate measure of the echo filter misadjustment error, and that a poor ENR represents a bad input block, dominated by either near-end speech or noise. A reasonable value for the filter relative change limit, $\Delta_{max}$, is the filter misadjustment error because this represents the approximate size of change needed to bring the error to zero. That is, a first simple approximation would be $-10 \log_{10} \Delta_{max} = \text{ERLE}_{max}$. However, good input blocks with high ENR allow greater changes (if needed) and poor blocks with low ENR limit the allowed change even more strictly. Thus other preferred embodiments take $-10 \log_{10} \Delta_{max}$ as various ENR-based modifications of this simple approximation. For example, ---
if (ENR < 0)
   $-10 \log_{10} \Delta_{max} = \text{ERLE}_{max}(mL) + 24$
elseif (ENR < 0.25 $\text{ERLE}_{max}(mL)$)
   $-10 \log_{10} \Delta_{max} = \text{ERLE}_{max}(mL) + 6$
elseif (ENR < 0.5 $\text{ERLE}_{max}(mL)$)
   $-10 \log_{10} \Delta_{max} = \text{ERLE}_{max}(mL) + 3$
elseif (ENR < 0.75 $\text{ERLE}_{max}(mL)$)
   $-10 \log_{10} \Delta_{max} = \text{ERLE}_{max}(mL) - 3$
else
   $-10 \log_{10} \Delta_{max} = \text{ERLE}_{max}(mL) - 6$

---

FIG. 1c illustrates a method which also controls a noise floor described below.

(d) Frequency Domain Adaptation

The foregoing acoustic channel filter block LMS adaptation can be transformed to the frequency domain which decorrelates the input. This permits the stepsize to depend upon frequency and thereby allow for spectral whitening to improve filter convergence. The idea is to use a stepsize in each frequency bin that is inversely proportional to the power spectrum of the far-end speech signal. However, the performance of this method is not reliable; so preferred embodiment frequency-dependent adaptations apply a smoothing (weighted averaging) over frequencies of the power spectrum for use with frequency-dependent stepsize. Block LMS adaptation in the frequency domain has the further benefit of lower computational load because the time-domain convolutions and correlations transform to multiplications in the frequency domain. The following paragraphs provide details.

The discrete Fourier transform is circular (periodic), whereas the desired convolutions-correlations are linear; so implement the transformed adaptation by "overlap-save" or "overlap-add" methods. In particular, first consider an overlap-save implementation with a 2N-point discrete Fourier transform (implemented as an FFT) where, again, N is the acoustic channel estimation filter length; the overlap-save method essentially adds N 0s to the N-length filter so that the wrap-around part of circular convolution contributes 0 and leaves the desired linear part for N of the outputs. Again, presume an adaptation block size, L, of less than or equal to the filter length; subsequent preferred embodiments will partition the filter into subfilters of smaller lengths to allow smaller FFT size which will be comparable with block size.

Let the 2N-vector $\hat{H}_{mL}$ denote the 2N-point FFT of the 2N-vector consisting of the N filter coefficients, $\hat{h}_{mL}(0)$, $\hat{h}_{mL}(1)$, ..., $\hat{h}_{mL}(N-1)$, plus N 0s; that is, with F denoting the 2N×2N FFT matrix, set:

$$\hat{H}_{mL} = F \begin{bmatrix} \hat{h}_{mL}(0) \\ \hat{h}_{mL}(1) \\ \vdots \\ \hat{h}_{mL}(N-1) \\ 0 \\ \vdots \\ 0 \end{bmatrix}$$

It is notationally convenient to express the FFT of the received far-end speech in terms of a diagonal matrix rather than a vector; thus let $X(mL)$ denote the 2N×2N diagonal matrix (rather than the 2N-vector) FFT of the 2N-vector of far-end speech samples centered about time mL:

$$X(mL) = \text{diag}\left\{ F \begin{bmatrix} x(mL-N) \\ x(mL-N+1) \\ \vdots \\ x(mL-1) \\ x(mL) \\ \vdots \\ x(mL+N-1) \end{bmatrix} \right\}$$

where diag{ } converts a vector into a diagonal matrix with the vector components along the matrix diagonal and the remainder of the matrix elements as 0s. This $X(mL)$ is the transform of blocks m and m−1 of far-end samples for the case of L=N; but for L<N, the block size does not align with the transform size, so 0s are inserted to the samples to make up the transform size. In particular, the L adaptation estimations (convolutions) computed in the time domain for block m are $\hat{y}(mL) = \Sigma_{0 \leq k \leq N-1} \hat{h}_{mL}(k) x(mL-k)$, $\hat{y}(mL+1) = \Sigma_{0 \leq k \leq N-1} \hat{h}_{mL}(k) x(mL+1-k)$, . . . , and $\hat{y}(mL+L-1) = \Sigma_{0 \leq k \leq N-1} \hat{h}_{mL}(k) x(mL+L-1-k)$ which requires N+L−1 far-end inputs, $x(mL-N+1), x(mL-N+2), \ldots, x(mL+L-1)$. Thus for L<N use:

$$X(mL) = \text{diag}\left\{F\begin{bmatrix} x(mL-N) \\ \vdots \\ x(mL-1) \\ x(mL) \\ \vdots \\ x(mL+L-1) \\ 0 \\ \vdots \\ 0 \end{bmatrix}\right\}$$

The L time domain convolutions defining the $\hat{y}(mL+j)$ transform to multiplications in the diagonal matrix operation $X(mL)\,\hat{H}_{mL}$ in the frequency domain. Indeed, let $\hat{Y}(mL)$ denote the 2N-vector resulting from the matrix operation $X(mL)\,\hat{H}_{mL}$. The overlap-save method saves the last N components of the 2N-vector $F^{-1}\hat{Y}(mL)=F^{-1}X(mL)\hat{H}_{mL}$, which are the desired linear convolutions, and discards the first N components which are circular convolutions. That is, define $\hat{y}(mL)$ as the N-vector including the desired convolutions:

$$\hat{y}(mL) = \begin{bmatrix} \hat{y}(mL) \\ \hat{y}(mL+1) \\ \vdots \\ \hat{y}(mL+N-1) \end{bmatrix}$$

Then $\hat{y}(mL)=[0_N I_N]F^{-1}\hat{Y}(mL)=[0_N I_N]F^{-1}X(mL)\hat{H}_{mL}$ where $0_N$ is the N×N matrix of 0s and $I_N$ is the N×N identity matrix. For the case L<N, modify $I_N$ to set $\hat{y}(mL+L)$, $\hat{y}(mL+L+1)$, ..., $\hat{y}(mL+N-1)$ to 0 because these convolutions go beyond block m and are not needed for filter updating; in fact, they are convolutions incorporating the 0 samples added to the far-end samples to fill out to the required FFT size.

Once $\hat{y}(mL)$ is computed (two FFTs, diagonal matrix operation, and IFFT), the L errors for block m may be computed in the time domain: $e(mL+j)=y(mL+j)-\hat{y}(mL+j)$ for $j=0, 1, \ldots, L-1$; and this is the output of the echo canceller as illustrated in FIGS. 2a-2b.

These error terms form an N-vector, $e(mL)$, which for the case L<N includes 0s in place of $e(mL+j)$ for $j=L, L+1, \ldots, N-1$. Then, as before, in preparation for another overlap-save frequency-domain computation, augment this vector with N 0s to form a 2N-vector and apply a 2N-point FFT:

$$E(mL) = F\begin{bmatrix} 0 \\ \vdots \\ 0 \\ e(mL) \\ e(mL+1) \\ \vdots \\ e(mL+N-1) \end{bmatrix} = F\begin{bmatrix} 0_N \\ I_N \end{bmatrix}e(mL),$$

Now the updating of the N filter coefficients at the start of the (next) block at time mL+L uses the gradient N-vector $\hat{h}_{\Delta,mL}$ which has each component as an L-term correlation of $e(mL)$ and a corresponding part of $x(mL)$; namely, $\hat{h}_{\Delta,mL}(k)=\Sigma_{0\leq j\leq L-1}e(mL+j)x(mL+j-k)$. The gradient thus appears in the time domain as the first N components of the 2N-vector $F^{-1}X^H(mL)\,E(mL)$; the second N components are discarded as part of the overlap-save method. Then transform the filter adaptation to the frequency domain by augmenting the gradient with 0s in the same manner as for $\hat{h}_{mL}$:

$$\hat{H}_{mL+L} = \hat{H}_{mL} + 2\mu(mL)F\begin{bmatrix} \hat{h}_{\Delta,mL}(0) \\ \hat{h}_{\Delta,mL}(1) \\ \vdots \\ \hat{h}_{\Delta,mL}(N-1) \\ 0 \\ \vdots \\ 0 \end{bmatrix}$$

$$= \hat{H}_{mL} + 2\mu(mL)F\begin{bmatrix} I_N & 0_N \\ 0_N & 0_N \end{bmatrix}F^{-1}X(mL)^H E(mL)$$

This updating in the frequency domain allows a generalization of the stepsize to depend upon frequency by simply changing the scalar stepsize into a diagonal matrix multiplying the gradient in the frequency domain:

$$\hat{H}_{mL+L} = \hat{H}_{mL} + 2F\begin{bmatrix} I_N & 0_N \\ 0_N & 0_N \end{bmatrix}F^{-1}\mu(mL)X(mL)^H E(mL)$$

where the stepsize matrix, $\mu(mL)$, is a 2N×2N diagonal matrix. A spectral whitening stepsize matrix would have elements $\mu(mL)_{kk}$ equal to functions of the power spectrum of the far-end input such as $\mu/P_{mL}(k)$ or $\mu/(\alpha+|X_{mL}(k)|^2)$ where $\mu$ and $\alpha$ are constants, $X_{mL}(k)=X(mL)_{k,k}$ is the kth component of the 2N-vector transform of the 2N-vector of far-end samples centered at mL, and $P_{mL}(k)$ is an autoregressive estimate of $|X_{mL}(k)|^2$ such as, $P_{mL}(k)=\lambda P_{mL-L}(k)+(1-\lambda)|X_{mL}(k)|^2$ with $\lambda$ a forgetting factor between 0 and 1. Note that the eigenvalues of the autocorrelation matrix of the input vector $x_{mL}$ are approximated by uniform sampling of the power spectrum $|X_{mL}(k)|$, and thus filter coefficients associated with frequencies having little power will converge more slowly. Hence, spectral whitening stepsize matrices can provide more uniform filter convergence.

The preferred embodiment stepsize optimization to find $\mu_{opt}(mL)$ in subsection (a) can be extended to the spectral whitening stepsize matrix. For example, with $\mu(mL)_{kk}$ equal to $\mu/P_{mL}(k)$, treat the $1/P_{mL}(k)$ as part of the gradient, let $\mu$ depend upon mL, and then optimize with respect to $\mu$. In particular, compute the analogs of $e_{old}(=\hat{y}-\hat{y}_{old})$ and $e_\Delta$ using the frequency domain; that is, compute a $\hat{y}_{old}(mL+L)$ analog from $X(mL+L)\hat{H}_{mL}$ and an $e_\Delta(mL+L)$ analog from $P_{mL+L}^{-1}X(mL+L)X(mL)^H E(mL)$ where $P_{mL+L}^{-1}$ is the inverse of the diagonal matrix with matrix elements $1/P_{mL}(k)$. As before, find the optimal $\mu$ as that which minimizes the quadratic error $\|e_{old}(mL+L)-\mu(mL)e_\Delta(mL+L)\|^2$.

The control of stepsize as in subsections (b) and (c) extend to the spectral whitening stepsize matrix.

The foregoing frequency-domain adaptation can also be implemented using the overlap-add method, sliding DFT, or other methods. Indeed, the block LMS adaptation may be simplified (but degraded) to operate in the frequency domain using circular convolutions (rather than the linear convolutions) and thereby further lower complexity of the computations.

(e) Smoothed Spectral Whitening Stepsize

In contrast to the foregoing frequency domain stepsize, a preferred embodiment frequency-domain stepsize matrix, $\mu(mL)$, uses the far-end power spectrum only after smoothing over frequencies. In particular, again let $X_{mL}(k)$ denote the kth component of $X_{mL}$, the 2N-point FFT of the 2N-vector of far-end samples about mL:

$$X_{mL} = F \begin{bmatrix} x(mL-N) \\ x(mL-N+1) \\ \vdots \\ x(mL-1) \\ x(mL) \\ \vdots \\ x(mL+N-1) \end{bmatrix}$$

Again, for the case of L<N, the samples beyond block m are taken as 0s and so:

$$X_{mL} = F \begin{bmatrix} x(mL-N) \\ \vdots \\ x(mL-1) \\ x(mL) \\ \vdots \\ x(mL+L-1) \\ 0 \\ \vdots \\ 0 \end{bmatrix}$$

Define the smoothed power spectrum, $S_{mL}$, by $S_{mL}(k) = \Sigma_{-M \leq j \leq M} c_j |X_{mL}(k+j)|^2$, where $c_j$ are smoothing filter coefficients and the smoothing filter length is at most 2M+1. For frequencies beyond the ends of the spectrum (k=0, 2N−1), use the periodicity of $X_{mL}(k)$ or extend by reflection or by 0s or other means. Then preferred embodiment stepsize (diagonal) matrix elements use this smoothed power spectrum; as examples, $\mu(mL)_{kk} = \mu/S_{mL}(k)$, $\mu(mL)_{kk} = \mu/(\alpha+S_{mL}(k))$, or $\mu(mL)_{kk} = \mu/S^{ar}_{mL}(k)$ where $S^{ar}_{mL}(k)$ is an autoregressive estimate analogous to $P_{mL}(k)$: $S^{ar}_{mL}(k) = \lambda S^{ar}_{mL-L}(k) + (1-\lambda)S_{mL}(k)$ with $\lambda$ the forgetting factor with preferred embodiment values lying in the range 0.1-0.7. Of course, other functions of the smoothed power spectrum could be similarly used. FIG. 1b illustrates an overall preferred embodiment frequency domain adaptation using the overlap-save method.

A smoothing filter could be a simple $c_0 = 0.5$ and $c_{-1} = c_1 = 0.25$ symmetric filter of length 3. For a block size 160 (20 ms speech frame size) and a filter length of 256, the FFT is 512-point and convenient smoothing filters have lengths up to about 33.

The foregoing preferred embodiment optimal stepsize and stepsize control also apply to the preferred embodiment smoothing of the far-end power spectrum for use in the frequency-dependent stepsize matrix. Further, these preferred embodiments also apply to implementations such as overlap-add, circular convolution, sliding DFT, and other frequency-domain approaches.

(f) Noise Floor for Control of Spectral Whitening

When a modest amount of near-end noise is present, the filter convergence can still be degraded by exaggeration of noise at frequencies where there is little far-end speech excitation. In these cases, the spectral whitening process increases the stepsize in the noise-dominated frequencies; that is, if the far-end smoothed power spectrum, $S_{mL}(k)$, is small for frequency k, then $\mu(mL)_{kk} = \mu/S_{mL}(k)$ is large. This leads to poor estimates of the filter response. Thus preferred embodiments introduce a noise floor to the spectral whitening. In particular, for the preferred embodiment $\mu(mL)_{kk} = \mu/S_{mL}(k)$, the modified preferred embodiment is $\mu(mL)_{kk} = \mu/\max(NF, S_{mL}(k))$ where NF is a noise floor. For a 512-point FFT and 16-bit fixed point samples, the noise floor may have values in the range dB. Analogous other limits are applicable to other $\mu(mL)_{kk}$ definitions using the far-end power spectrum.

(g) Adaptive Control of Noise Floor

Again, control of spectral whitening (and stepsize) provides robustness against divergence of the filter estimate, it can also degrade the ability of the echo canceller to adapt to true changes in the acoustic channel. Therefore, preferred embodiment methods adaptively control the spectral whitening noise floor, NF (plus the filter change limit, $\Delta_{max}$). As in the foregoing, the control is based on continuously adaptive estimates of two parameters: the current convergence of the acoustic channel estimate (as measured by the maximum echo return loss enhancement, $ERLE_{max}$, over recent blocks) and the amount of near-end signal in the current block (echo to near-end noise ratio, ENR).

The preferred embodiment control methods use $ERLE_{max}$ and ENR to adjust the noise floor for spectral whitening, NF (plus the maximum filter change, $\Delta_{max}$). In both cases assume that $ERLE_{max}$ provides an approximate measure of the echo filter misadjustment error, and a poor ENR represents a bad input block, dominated by either near-end speech or noise. For the spectral whitening noise floor, because the filter adaptation is based on the current echo error, set the noise floor, NF, to an estimate of the echo-error-to-noise ratio. The echo error should be the current echo attenuated by $ERLE_{max}$, so the echo-error-to-noise ratio is estimated by the ENR attenuated by $ERLE_{max}$; that is, a preferred embodiment takes $NF = ENR \times ERLE_{max}$. Experimentally the appropriate adjustment of the estimation parameters (both $\Delta_{max}$ and NF) results in a robust echo canceller that still maintains fast convergence for acoustic channel variations. FIG. 1c illustrates a method.

(h) Subfilter Energy Proportional Stepsize

A hands-free phone in an automobile has a fairly short acoustic channel and a filter of length 256 together with a block size of 160 may suffice. This permits use of a convenient 512-point FFT. However, more accurate filters or filters for hands-free phones in offices and conference rooms typically require much larger filter length, but the corresponding larger FFTs become unwieldy and the filter adaptation convergence slows. Consequently, preferred embodiments partition the filter into subfilters of convenient length (e.g., 256 taps); and this partitioning allows for each subfilter adaptation to depend upon the subfilter's portion of the total filter strength. Proportional adaptation provides faster initial convergence.

In particular, presume an acoustic channel estimation filter $\hat{h}_{mL}$ of length PN and partition the filter into P subfilters $\hat{h}_{mL}^{(p)}$ with each subfilter of length N by setting: $\hat{h}_n^{(p)}(k) = \hat{h}_n(pN+k)$. Then the acoustic channel estimation filtering can be written as:

$$\hat{y}(n) = \sum_{0 \leq k \leq PN-1} \hat{h}_n(k)x(n-k)$$

-continued $$= \sum_{0 \le p \le P-1} \sum_{0 \le k \le N-1} \hat{h}_n^{(p)}(k) x(n - pN - k)$$

$$= \sum_{0 \le p \le P-1} \sum_{0 \le k \le N-1} \hat{h}_n^{(p)}(k) x^{(p)}(n - k)$$

$$= \sum_{0 \le p \le P-1} \langle \hat{h}_{mL}^{(p)} \mid x^{(p)}(n) \rangle$$

where $x^{(p)}(n)$ is in the L+N sample portion of the far-end samples which the pth subfilter uses: $x^{(p)}(n)=x(n-pN)$. Then each subfilter and the corresponding far-end samples can be transformed to the frequency domain as previously and the results combined due to the linearity of the FFT. In particular, for block mL define P subfilter 2N-vectors and far-end sample 2N×2N matrices as:

$$\hat{H}_{mL}^{(p)} = F \begin{bmatrix} \hat{h}_{mL}^{(p)}(0) \\ \hat{h}_{mL}^{(p)}(1) \\ \vdots \\ \hat{h}_{mL}^{(p)}(N-1) \\ 0 \\ \vdots \\ 0 \end{bmatrix} \text{ and}$$

$$X^{(p)}(mL) = \text{diag}\left\{ F \begin{bmatrix} x^{(p)}(mL-N) \\ x^{(p)}(mL-N+1) \\ \vdots \\ x^{(p)}(mL-1) \\ x^{(p)}(mL) \\ \vdots \\ x^{(p)}(mL+N-1) \end{bmatrix} \right\}$$

Then compute the contribution of each subfilter to the acoustic channel estimation in the time domain as previously and sum:

$$\hat{y}(mL) = \sum_{0 \le p \le P-1} [0_N \ I_N] F^{-1} X^{(p)}(mL) \hat{H}_{mL}^{(p)}$$

$$= [0_N \ I_N] F^{-1} \sum_{0 \le p \le P-1} X^{(p)}(mL) \hat{H}_{mL}^{(p)}$$

Again, find the error (estimated-echo-cancelled) signals for the frame; this is the echo canceller output.

$$e(mL) = y(mL) - \hat{y}(mL)$$

Then for each subfilter compute the adaptation with the subfilter gradient plus stepsize matrix in the frequency domain:

$$E(mL) = F \begin{bmatrix} 0_N \\ I_N \end{bmatrix} e(mL)$$

-continued $$\hat{H}_{mL+L}^{(p)} = \hat{H}_{mL}^{(p)} + 2F \begin{bmatrix} I_N & 0_N \\ 0_N & 0_N \end{bmatrix} F^{-1} \mu^{(p)}(mL) X^{(p)}(mL)^H E(mL)$$

Preferred embodiment subfilter stepsize matrices are proportioned to reflect relative strength among the subfilters as follows. Because the Fourier transform is an isometry, $\|\hat{H}_{mL}^{(p)}\|^2 = \sum_{0 \le j \le 2N-1} |\hat{H}_{mL}^{(p)}(j)|^2 = \sum_{0 \le k \le N-1} |\hat{h}_{mL}^{(p)}(k)|^2$ which is a measure of the energy of the portion of the acoustic channel impulse response corresponding to the pth subfilter. Thus the fraction of the total impulse response energy due to the pth subfilter is $\rho^{(p)}(mL) = \|\hat{H}_{mL}^{(p)}\|^2 / \sum_{0 \le q \le P-1} \|\hat{H}_{mL}^{(q)}\|^2$, and the relative strength of the pth subfilter is $\rho^{(p)}(mL) = \|\hat{H}_{mL}^{(p)}\|^2 / \max_q \|\hat{H}_{mL}^{(q)}\|^2$, and thus some preferred embodiments have a stepsize matrix for the pth subfilter as $\rho^{(p)}(mL) \mu_{opt}(mL)$ where $\mu_{opt}(mL)$ is the optimal stepsize for the full filter as computed in the foregoing:

$$\mu_{opt}(mL) = \langle e_{old}(mL+L) \mid e_\Delta(mL+L) \rangle / \|e_\Delta(mL+L)\|^2$$

The filter partitioning into subfilters translates into (for the time domain):

$$e_{old}(mL+L+j) = y(mL+L+j) - \sum_{0 \le p \le P-1} \langle \hat{h}_{mL}^{(p)} \mid x^{(p)}(mL+L+j) \rangle$$

$$e_\Delta(mL+L+j) = \sum_{0 \le p \le P-1} \langle \hat{h}_{\Delta,mL}^{(p)} \mid x^{(p)}(mL+L+j) \rangle$$

As previously, the L length-N correlations for each of $e_{old}(mL+L)$ and $e_\Delta(mL+L)$ are performed in the frequency domain as a multiplication; additionally, the final inner product and squared norm could also be evaluated in the frequency domain, again due to the isometry of the Fourier transform.

$$e_{old}(mL+L) = y(mL+L) - \sum_{0 \le p \le P-1} [0_N \ I_N] F^{-1} X^{(p)}(mL) \hat{H}_{mL}^{(p)}$$

$$e_\Delta(mL+L) = \sum_{0 \le p \le P-1} F^{-1} X^{(p)}(mL+L)^H F \begin{bmatrix} I_N & 0_N \\ 0_N & 0_N \end{bmatrix} F^{-1} X^{(p)}(mL)^H E(mL)$$

The overall preferred embodiment adaptation in the frequency domain with an energy-proportional scalar stepsize for the subfilters is then $$\hat{H}_{mL+L}^{(p)} = \hat{H}_{mL}^{(p)} + 2\rho^{(p)}(mL)\mu_{opt}(mL) F \begin{bmatrix} I_N & 0_N \\ 0_N & 0_N \end{bmatrix} F^{-1} X^{(p)}(mL)^H E(mL)$$

Preferred embodiment adaptation in the frequency domain with spectral whitening in addition to the energy-proportional stepsize for the subfilters is then:

$$\hat{H}_{mL+L}^{(p)} = \hat{H}_{mL}^{(p)} + 2F \begin{bmatrix} I_N & 0_N \\ 0_N & 0_N \end{bmatrix} F^{-1} \mu^{(p)}(mL) X^{(p)}(mL)^H E(mL)$$

where $\mu^{(p)}(mL)_{kk} = \rho^{(p)}(mL)\mu_{opt}(mL)/S_{mL}^{(p)}(k)$ with $S_{mL}^{(p)}(k)$ the smoothed power spectrum of $x^{(p)}(mL)$.

Alternative preferred embodiments account for the phenomenon that the estimation noise in the subfilters with the most energy cannot be reduced below the error in the subfilters with the least energy as the filter coefficients converge;

these preferred embodiments limit the larger energies based on the current estimate of the filter measurement noise, so as the filter converges the subfilter stepsizes become evenly distributed. In particular, $\rho^{(p)}(mL)=1$ when the error becomes small as in the preferred embodiment below.

(i) Stepsize Control for Subfilters

The stepsize control of subsections (b)-(c) and (f)-(g) also applies to the subfilters. In particular, each subfilter has a $\Delta_{mL}^{(p)}$ which measures the energy in the subfilter update normalized by the subfilter energy:

$$\Delta_{mL}^{(p)} = \left\|\mu(mL)\hat{h}_{\Delta,mL}^{(p)}\right\|^2 / \left\|\hat{h}_{mL}^{(p)}\right\|^2$$
$$= \left\|\mu^{(p)}(mL)X^{(p)}(mL)^H E(mL)\right\|^2 / \left\|\hat{H}_{mL}^{(p)}\right\|^2$$

Again, impose a maximum, $\Delta^{(p)}_{max}$ and scale back $\mu^{(p)}(mL)$ to avoid exceeding the maximum. As before, the value of $\Delta^{(p)}_{max}$ derives from $ERLE_{max}$ and ENR, and thus is the same for all subfilters. A simple example relation is:

$$-10 \log_{10} \Delta^{(p)}_{max} = ERLE_{max} + 12(ENR/ERLE_{max} - \frac{1}{2})$$

Alternatively, the values could depend upon the ratio $ENR/ERLE_{max}$ in a discrete manner as in the foregoing and following preferred embodiments.

Similarly, the noise floors for the subfilters, $NF^{(p)}$, could all be the same, and as a simple example:

$$-10 \log_{10} NF^{(p)} = ENR + ERLE_{max} - 10 \log_{10} \{\text{mean } \Sigma_p S_{mL}^{(p)}(k)\}$$

where mean $\Sigma_p S_{mL}^{(p)}(k)$ is the average (mean) smoothed power over the frequencies of the loudspeaker input being filtered.

(j) Combined Feature Preferred Embodiment

The following alternative preferred embodiment has subfilters, frequency-domain computations, optimal stepsize, spectral smoothing, stepsize control, and proportional subfilter stepsizes. Using notation similar to the foregoing, variables persisting from frame m include:

PN (filter length) prior loudspeaker input samples, $x(mL+L-j)$;

P subfilters in frequency domain $\hat{H}^{(p)}_{mL}$;

longterm (autoregressive models) of various powers $\|\hat{H}^{(p)}_{mL}\|^2$, $\|y(mL)\|^2$, $\|e(mL)\|^2$, spectra, and $ERLE_{max}(mL)$.

The method includes the following steps (1) through (18) with noted options.

(1) receive input frame m+1 of L samples from the microphone, $y(mL+L), y(mL+L+1), \ldots, y(mL+2L-1)$, and for the loudspeaker: $x(mL+L), x(mL+L+1), \ldots, x(mL+2L-1)$ and append the loudspeaker samples to last PN−1 received samples (needed due to the total filter length equal PN)

(2) transform (FFT length 2N) to frequency domain blocks of length N+L of the loudspeaker input needed for each length N subfilter (if L<N, then pad with 0s so that $x^{(p)}(mL+L)$ is the 2N-vector of samples $x(mL+L−pN), x(mL+L−pN+1), \ldots, x(mL+L−pN+L−1), 0, \ldots, 0$) and put the transform into diagonal matrix form:

$$X^{(p)}(mL+L) = \text{diag}\{F x^{(p)}(mL+L)\}$$

(3) echo estimation as the sum of subfilterings in frequency domain followed by inverse transform and discarding the circular convolution part (also for L<N discard $\hat{y}(mL+2L), \hat{y}(mL+2L+1), \ldots, \hat{y}(mL+L+N-1)$ which are convolutions involving the pad 0s of the $x^{(p)}(mL+L)$).

$$\hat{Y}(mL+L) = \Sigma_p X^{(p)}(mL+L)\hat{H}^{(p)}_{mL}$$

$$\hat{y}(mL+L) = [0_N I_N]F^{-1}\hat{Y}(mL+L)$$

(4) echo cancelled output for frame mL+L:

$$e(mL+L) = y(mL+L) - \hat{y}(mL+L)$$

this is the final output unless there is filter adaptation (updating) which then updates the echo-cancelled output.

(5) compute echo return loss enhancement, ERLE (expressed in dB)

$$ERLE(mL+L) = 10 \log_{10}\{\|y(mL+L)\|^2/\|e(mL+L)\|^2\}$$

(6) estimate long-term ERLE with long-term estimates of $\|y\|^2$ and $\|e\|^2$ using autoregressive models with coefficient $\lambda_{longterm} = 0.16$ (=−0.8 dB)

$$y_{power}(mL+L) = \lambda_{longterm} y_{power}(mL) + (1-\lambda_{longterm})\|y(mL+L)\|^2$$

$$e_{power}(mL+L) = \lambda_{longterm} e_{power}(mL) + (1-\lambda_{longterm})\|e(mL+L)\|^2$$

$$ERLE_{longterm}(mL+L) = 10 \log_{10}\{y_{power}(mL+L)/e_{power}(mL+L)\}$$

(7) check if filter adaptation should be applied (obvious near-end talk implies adaptation should not be omitted and the filter should be frozen)

$$erl = -10 \log_{10}\{\|y(mL+L)\|^2/\|x(mL+L)\|^2\}$$

(x is a length PN+L vector, whereas y is a length L vector)

$$x_{power} = 10 \log_{10}\{\|x(mL+L)\|^2/\max_j |x(mL+j)|\}$$

if $erl > -12$ (dB) and $x_{power} > 30$ (dB), then apply filter adaptation as described in following steps (8)-(17); otherwise skip to step (18). The erl condition roughly requires the microphone input be less than four times the loudspeaker input, and the $x_{power}$ condition roughly requires significant loudspeaker input power.

(8) compute subfilter power with an autoregressive model, this will be used for limiting subfilter stepsizes in the steps below $$\hat{H}^{(p)}_{power;mL+L} = 0.95 \hat{H}^{(p)}_{power;mL} + 0.05\|\hat{H}^{(p)}_{mL}\|^2$$

$$\hat{H}_{power;mL+L} = \Sigma_p \hat{H}^{(p)}_{power;mL+L}$$

(9) estimate echo-to-noise ratio, ENR

ErlePower = min$\{0.9999, 10^{-0.1 \min\{ERLE(mL+L), ERLE_{longterm}(mL+L)\}}\}$
ErleMaxPower = $10^{-0.1 ERLE_{max}(mL)}$
if (ErlePower − ErleMaxPower > 0.0001)
    ENR = $10 \log_{10}\{(1 - \text{ErlePower})/(\text{ErlePower} - \text{ErleMaxPower})\}$
else
    ENR = 100

(10) limit $ERLE(mL+L)$ to lie in the range 0 dB to 50 dB and then use it to update $ERLE_{max}$ by limited up and down increments with a smaller down increment when ENR is negative:

$ERLE_{down} = \min\{\text{Down, Fall } ERLE_{max}(mL)\}$
(Down = −0.1; Fall = −0.01)
$ERLE_{up} = -4 ERLE_{down}$ -continued

```
if (ENR < 0)
    ERLE_down = 0.1 ERLE_down
if ( ERLE(mL + L) > ERLE_max(mL) + ERLE_up)
    ERLE_max(mL + L) = ERLE_max(mL) + ERLE_up
elseif (ERLE(mL + L) < ERLE_max(mL) + ERLE_down)
    ERLE_max(mL + L) = ERLE_max(mL) + ERLE_down
else
    ERLE_max(mL + L) = ERLE(mL + L)
```

(11) stepsize limits: use smaller maximum adaptation stepsize as near-end source increases relative to the echo

```
if (ENR < 0)
    Δ_max,dB = -(ERLE_max(mL + L) + 24)
elseif (ENR < 0.25 ERLE_max(mL + L))
    Δ_max,dB = -(ERLE_max(mL + L) + 6)
elseif (ENR < 0.5 ERLE_max(mL + L))
    Δ_max,dB = -(ERLE_max(mL + L) + 3)
elseif (ENR < 0.75 ERLE_max(mL + L))
    Δ_max,dB = -(ERLE_max(mL + L) - 3)
else
    Δ_max,dB = -(ERLE_max(mL + L) - 6)
``` limit $\Delta_{max,dB}$ to lie in the range −36 dB to −6 dB
$\Delta_{max} = 10^{0.1\,\Delta max,dB}$ which will lie the range 0.00025 to 0.25

(12) the subfilter stepsize will be determined as a whole-filter optimal stepsize multiplied by a subfilter factor, if the subfilter factor is to be proportional to subfilter power, then:

$\hat{H}_{powerMax;mL+L} = 10^{-0.1 * ERLE(mL+L)} \max_p \{\hat{H}^{(p)}_{power;mL+L}\}$ $\hat{H}_{powerMin;mL+L} = 10^{-0.1 * 24} \hat{H}_{powerMax;mL+L}$ also apply a lower limit of 0.000001

$\mu^{(p)} = \min\{\hat{H}^{(p)}_{power;mL+L}, \hat{H}_{powerMax;mL+L}\}$ $\mu^{(p)} = \max\{\mu^{(p)}, \hat{H}_{powerMin;mL+L}\}$ $\mu^{(p)} = \sqrt{\mu^{(p)}}$ $\mu^{(p)} = \mu^{(p)} / \Sigma_q \mu^{(q)}$ if the subfilter factor is not to be proportional to subfilter power, then:

$\mu^{(p)} = 1$

(13) frequency-dependent (spectral whitening) stepsize diagonal matrix, μ, with spectral smoothing (smoothing filter coefficients $c_j$) of the loudspeaker input, $X_{mL+L}^{(p)}$, for each subfilter (the trivial filter $c_j = \delta_{0j}$ is equivalent to eliminating the spectral smoothing). Also, insert a noise floor, NF, to avoid exaggeration of noise in low energy frequencies:

$S_{mL}^{(p)}(k) = \Sigma_{-M \leq j \leq M} c_j |X_{mL}^{(p)}(k+j)|^2$ the smoothed spectrum $NF = 10^{-0.1 * min(24, ENR-ERLE_{max})} \{\Sigma_k \Sigma_q S_{mL}^{(q)}(k)/2N\}$ $\mu_{kk} = 1/(NF + \Sigma_q S_{mL}^{(q)}(k))$

(14) then the subfilter gradient using the (old) e(mL+L) [relabeled $e_{old}$(mL+L) for clarity] from step (4) with this frequency-dependent matrix (and proportional subfilter factor)

$\hat{H}^{(p)}_{\Delta;mL+L} = F \begin{bmatrix} I_N & 0_N \\ 0_N & 0_N \end{bmatrix} F^{-1} \mu^{(p)} \mu X^{(p)}(mL+L)^H E_{old}(mL+L)$

(15) optimal full-filter stepsize, $\mu_{opt}$ (the $e_{old}$(mL+L) computation was already done in step (4)):

$e_{old}(mL+L) = y(mL+L) - \Sigma_{0 \leq p \leq P-1}[0_N I_N]F^{-1}X^{(p)}(mL+L)\hat{H}^{(p)}_{mL}$ $e_\Delta(mL+L) = \Sigma_q F^{-1} X^{(q)}(mL+L)\hat{H}^{(q)}_{\Delta;mL+L}$ $\mu_{opt}(mL+L) = <e_{old}(mL+L) | e_\Delta(mL+L)>/\|e_\Delta(mL+L)\|^2$

(16) stepsize control by upper limit for $\mu_{opt}$(mL+L):

$\hat{H}_{scaled\,power;mL+L} = \Delta_{max} \hat{H}_{power;mL+L}$
(scaled smoothed total filter power)
if $(\mu_{opt}(mL+L)^2 \Sigma_q \|\hat{H}^{(q)}_{\Delta;mL+L}\|^2 > \hat{H}_{scaled\,power;mL+L})$
    $\mu_{opt}(mL+L) = \sqrt{(\hat{H}_{scaled\,power;mL+L}/\Sigma_q \|\hat{H}^{(q)}_{\Delta;mL+L}\|^2)}$

(17) update subfilters using optimal stepsize and gradient, plus update echo-cancelled output; if there were no filter adaptation, then there would not be any updates and the step (4) output (relabeled $e_{old}$(mL+L) here) would be the final output.

$\hat{H}^{(p)}_{mL+L} = \hat{H}^{(p)}_{mL} + \mu_{opt}(mL+L)\hat{H}^{(p)}_{\Delta;mL+L}$ $e(mL+L) = e_{old}(mL+L) - \mu_{opt}(mL+L)e_\Delta(mL+L)$ The output update $e_\Delta$(mL+L) can be tapered over the first few samples to smooth the transition.

(18) update stored loudspeaker input (PN+L samples) by shifting one frame (L samples) to discard oldest frame and make space for the next frame input in step (1) for frame m+2.

5. Echo Suppression

FIGS. 2a-2b illustrate functional blocks of a preferred embodiment echo suppression (ES) system as part of an overall hands-free system with echo cancellation; these blocks may be implemented as hardware circuits or software routines on a programmable processor or a mixture. The ES system has four operating states: (1) Idle, (2) Double-talk, (3) Far-end talk only, and (4) Near-end talk only. In each state there is a desired (target) attenuation level both for the received signal, r(n), to generate input to the loudspeaker, x(n), and for the echo-cancelled signal, e(n), to generate output, s(n), to send to the far-end. For example, in state (3) the desired attenuation by send amplifier $A_S$ is large, this will reduce residual echo, but in state (4) the desired attenuation by send amplifier $A_S$ is small or none. In state (2) double-talk situations, both received and sent paths desirably are attenuated by receive amplifier $A_R$ and send amplifier $A_S$ to control echo while still allowing both speakers to be heard. In state (1) idle both received and sent signals may be passed through without attenuation, this preserves background noise characteristics, or the echo-cancelled output alone can be attenuated to reduce ideal noise. Also, the type of transmission (full-duplex, partial-duplex, half-duplex) influences the desired attenuation levels. ITU has recommended attenuation levels for various situations.

The preferred embodiments compute the gains (attenuations) for the two amplifiers as a linear combination of the desired attenuation levels for the four states with the linear combination coefficients crudely relating to the probability of the system persisting in the corresponding state. The four coefficients are computed as the relative sizes of four hangover counters; the counters are updated every frame (block) and lie in the range 0 to a maximum, $C_{ES,MAX}$.

The ES system operates roughly as follows; a more detailed description appears in subsequent paragraphs. During a persistent condition (e.g., steady far-end talking and no near-end talking), the ES state (e.g., state (3)) will be constant and at each new frame the counter corresponding to that state (e.g., counter 3) is incremented while the other three counters are decremented with saturation at both 0 and the maximum. This adjusts the gains closer to the desired attenuation levels for such a state. Whereas, at changes in conditions (e.g., a near-end speaker begins talking in addition to the far-end talking which means a transition to double-talk state (2)), the counters need a large adjustment (e.g., counter 2 is incremented to at least a minimum and the other three counters set to 0) in order to approach the desired attenuations. The large counter adjustments may be either quick or with a time-delay which allows for a smoother transition and avoids switching artifacts. FIG. 1e is a state diagram roughly illustrating the three types of counter adjustments: incremental (solid arrows), time-delayed (broken arrows), and quick (dotted arrows).

The FIGS. 2a-2b preferred embodiment ES system includes an ES Controller, Far-end and Near-end Voice Activity Detectors (VADs), Terminal Coupling Loss (TCL) Estimator, (optional) Comfort Noise Generator (CNG), and far-end (receive) and near-end (send out) amplifiers (attenuators) $A_R$ and $A_S$, respectively. The ES system is a state machine with input samples of the received far-end signal, r(n), and the echo-cancelled near-end signal, e(n), and output samples of the attenuated far-end signal, x(n), to drive the loudspeaker and the attenuated echo-cancelled near-end signal, s(n), to send out to the far end. The ES controller estimates the current state of the ES system using the far-end and near-end VAD decisions, the TCL estimation, and the estimated contents of the hangover counters. If comfort noise insertion is enabled, the ES controller also determines the comfort noise level. The following paragraphs describe the operation in more detail.

First, denote the Far-end VAD decision as $d_{VAD\text{-}DL}$ with DL for "downlink" and the Near-end VAD decision as $d_{VAD\text{-}UL}$ with UL for "uplink". Each VAD decision is one of three possibilities, 0 for "inactive", 1 for "marginally active", and 2 for "strongly active". The preferred embodiment ES system may use the preferred embodiment VAD of foregoing section 2 for both the far-end VAD and the near-end VAD, or other VADs may be used provided they have analogous three possible outputs. Similarly, the preferred embodiment ES system may be used with the preferred embodiment acoustic echo canceller of section 4 or any other type of acoustic echo canceller.

The terminal coupling loss (TCL) is essentially the ratio of received input power after attenuation (and applied to the loudspeaker) to acoustic-echo-cancelled input power from the microphone, and thus TCL high indicates far-end talk only, and TCL low indicates near-end talk only, double-talk, or poor echo cancellation. The preferred embodiment TCL Estimator uses smoothed estimates of the signal energies. In particular, let $r_N$ and $e_N$ denote the observation vectors of the far-end and near-end VADs, respectively. That is, with a sampling interval of length T and sampling time t expressed as integer n when $t=t_0+nT$ where to is an initial time, define:

$$r_N(n) = \begin{bmatrix} r(n) \\ \vdots \\ r(n-k) \\ \vdots \\ r(n-N+1) \end{bmatrix} \text{ and } e_N(n) = \begin{bmatrix} e(n) \\ \vdots \\ e(n-k) \\ \vdots \\ e(n-N+1) \end{bmatrix}$$

And let $x(n)=g_R r(n)$ where $g_R$ is the gain applied by amplifier $A_R$. AS in foregoing VAD section 2, for frame time m (the time $t_0+mNT$ at the start of the mth frame) define the corresponding frame power estimates, $p_x(m)$ and $p_e(m)$, as the average sample energy over the last N samples (the observation vector):

$$p_x(m)=1/N \Sigma_{0 \leq k \leq N-1} x^2(mN-k)$$

$$p_e(m)=1/N \Sigma_{0 \leq k \leq N-1} e^2(mN-k)$$

The smoothed energies are then estimated using a second order weighted moving average:

$$P_x(m)=\Sigma_{0 \leq j \leq 2} \lambda_{TCL}(j) p_x(m-j)$$

$$P_e(m)=\Sigma_{0 \leq j \leq 2} \lambda_{TCL}(j) p_e(m-j)$$

where for the first preferred embodiment the three weights $\lambda_{TCL}(j)$ are 0.7061, 0.2233, and 0.0706 for j=0,1, and 2, respectively. The TCL estimate (in dB) is the ratio of the smoothed attenuated received far-end power to the smoothed near-end (echo-cancelled) power:

$$\check{T}CL(m)=10 \log_{10}(P_x(m)/P_e(m))$$

For each input frame (N samples), the ES state is determined in order to update the appropriate counter and thereby determine the gains (attenuations) to be applied in the downlink amplifier ($A_R$) and the uplink amplifier ($A_S$). The ES controller determines the state, updates the corresponding state hangover counter, and computes the gain as follows.

(a) State Determination.

The preferred embodiment ES controller determines the state by the two VAD outputs plus a comparison of the TCL estimate, TCL(m), to dynamic thresholds $\Gamma_{TCL,FE}(m)$, $\Gamma_{TCL,NE}(m)$ (not dynamic), and $\Gamma_{TCL,DT}(m)$ for the mth frame; note that the subscripts FE, NE, and DT refer to Far-end, Near-end, and Double-talk, respectively. In particular, first set the dynamic thresholds using the average power, $p_x(m)$, and reference thresholds, $\Gamma_{TCL,FE,L}$, $\Gamma_{TCL,DT,L}$, $\Gamma_{TCL,FE,N}$, $\Gamma_{TCL,DT,N}$, and $\Gamma_{TCL,NE,0}$ (where subscript L indicates Loud and subscript N indicates Nominal); plus the power threshold for loud signals in the downlink, $\Gamma_{Loud}$:

when $10 \log_{10}(p_x(m)) > \Gamma_{Loud}$, set:

$$\Gamma_{TCL,FE}(m)=\Gamma_{TCL,FE,L}$$

$$\Gamma_{TCL,DT}(m)=\Gamma_{TCL,DT,L}$$

when $10 \log_{10}(p_x(m)) \leq \Gamma_{Loud}$, set:

$$\Gamma_{TCL,FE}(m)=\Gamma_{TCL,FE,N}$$

$$\Gamma_{TCL,DT}(m)=\Gamma_{TCL,DT,N}$$

in both cases $$\Gamma_{TCL,NE}(m)=\Gamma_{TCL,NE,0}$$

Then determine the ES state for the mth frame, denoted $\eta_{ES}(m)$, from the following table:

| Far-end VAD $d_{VAD,UL}(m)$ | 1 or 2 (marginally/ strongly active) | 0 (inactive) | 0 (inactive) | else |
|---|---|---|---|---|
| Near-end VAD $d_{VAD,UL}(m)$ | n/a | 1 or 2 (marginally/ strongly active) | 0 (inactive) | |
| TCL Estimation $\check{T}CL(m)$ | High $\check{T}CL(m) > \Gamma_{TCL,FE}(m)$ | Low $\check{T}CL(m) < \Gamma_{TCL,NE}(m)$ | n/a | |
| ES state $\eta_{ES}(m)$ | 3 (Far-end only) | 4 (Near-end only) | 1 (idle) | 2 (double talk) |

Note that a VAD with only two outputs ("inactive" or "active") would suffice for this determination, but the "strongly active" decision is used for state change characterization below. The preferred embodiment values for these thresholds are: $\Gamma_{TCL,FE,L}=6$ dB, $\Gamma_{TCL,DT,L}=0$ dB, $\Gamma_{TCL,FE,N}=12$ dB, $\Gamma_{TCL,DT,N}=6$ dB, and $\Gamma_{TCL,NE,0}=0$ dB; plus $\Gamma_{Loud}=70$ dB (for 16-bit fixed point samples). Preferred embodiment initial settings (0th frame) for the dynamic variables are: $\check{T}CL(0)=0$, $\Gamma_{TCL,FE}(0)=0$, $\Gamma_{TCL,D}(0)=0$, and $\Gamma_{TCL,NE}(0)=0$; the initial state is taken to be the idle state (1): $\eta_{ES}(0)=1$.

This use of dynamic thresholds allows the ES controller to deal with loud signals in the downlink. Indeed, loud signals in the downlink overdrive the loudspeaker and generate clipping which leads to low acoustic echo cancellation performance in terms of terminal coupling loss with annoying echo residuals in the uplink when in the Far-end only state (3). In-particular, when a loud signal appears in the downlink, decrease the TCL Far-end threshold which favors the Far-end only state (3). A subsequent attenuation is then applied in the uplink.

(b) Counter Update.

To maintain smooth switching in the downlink and uplink attenuations at transitions from one state to another state, preferred embodiments replace immediate switching to the desired attenuations for the current state with a dynamic linear combination of the desired attenuations for the four possible states. As described in following subsection (c), the linear combination coefficients are computed as relative sizes of four "hangover" counters, $c_{ES,1}(m)$, $c_{ES,2}(m)$, $c_{ES,3}(m)$, $c_{ES,4}(m)$, where counter $c_{ESj}(m)$ corresponds to state j for frame m. Thus updating the counters at each frame adjusts their relative sizes and the attenuations applied by the amplifiers.

In particular, for frame m the counters are updated as follows. First, if there is no state transition ($\eta_{ES}(m)=\eta_{ES}(m-1)$), then increment the counter corresponding to the current state by 1 and decrement the counters of the three other states by 1:

$$c_{ESj}(m) = c_{ESj}(m-1) + 1 \quad \text{for } j = \eta_{ES}(m)$$
$$c_{ESj}(m) = c_{ESj}(m-1) - 1 \quad \text{for } j \neq \eta_{ES}(m)$$

The counters are confined to a range and saturate at the ends: $0 \leq c_{ESj}(m) \leq C_{ES,MAX}$ where the first preferred embodiment has $C_{ES,MAX}$ defined in terms of a "Hang Time" $\tau_H$ and the sampling frequency $f_e$ plus the frame size, N; namely, $$C_{ES,MAX} = \text{round}\{\tau_H f_e \max(1, (a_{UL,1})_{dB}/-3)/N\}$$

where $a_{UL,1}$ is the desired uplink attenuation for idle state (1) and expressed in dB. The preferred embodiment values N=160 samples, $f_e$=8000 samples/s, $\tau_H$=150-250 ms, and $a_{UL,1}$=3 dB (full-duplex) lead to $C_{ES,MAX}$=8-13. This updating drives the attenuations to saturate at the desired attenuations for the state $\eta_{ES}(m)$; see subsection (c).

In contrast, when there is a state transition ($\eta_{ES}(m) \neq \eta_{ES}(m-1)$), the first preferred embodiments have three possible counter updatings: two with large counter adjustments (quick updating and time delay updating) and the third with the increment/decrement as in the foregoing paragraphs. Thus first check whether any of the criteria for large counter adjustments are met, if not, then increment/decrement. The large adjustment criteria and corresponding counter updatings are:

(i) Quick Updating.

When the state transition is from idle state (1) to a talking state, reset all counters to 0 except the counter for the current state which is incremented:

$$c_{ESj}(m) = \max\{c_{ESj}(m) + 1, C_{ES,SW}\} \quad \text{for } j = \eta_{ES}(m)$$
$$c_{ESj}(m) = 0 \quad \text{for } j \neq \eta_{ES}(m)$$

where the "switching counter" $C_{ES,SW}$ (defined below) provides an upper limit so the counter for the current state does not become comparatively too large. Quick updating allows for immediate attenuation changes and thus only applies to transitions where the attenuation discontinuity does not produce annoying artifacts. In particular, the preferred embodiment provides quick updating for transitions which satisfy any one of the following three criteria:

$$d_{VAD,DL}(m)=2 \text{ and } \max\{c_{ES,2}(m-1), c_{ES,4}(m-1)\}=0;$$

$$d_{VAD,UL}(m)=2 \text{ and } \max\{c_{ES,2}(m-1), c_{ES,3}(m-1)\}=0;$$

$$d_{VAD,DL}(m)=d_{VAD,UL}(m)=2 \text{ and } \check{T}CL(m)<\Gamma_{TCL,DT}(m).$$

The first includes a transition from the idle state (1) to far-end talking, either state (2) or state (3); the second includes a transition from the idle state (1) to near-end talking, either state (2) or state (4); and the third includes a transition from either a far-end talking state (3) or a near-end talking state (4) to a double-talk state (2). These criteria may define a quick change index, $I_{ES}(m)$, which would be computed for each new frame to see if a quick counter adjustment is required.

(ii) Time-delayed counter updating limits other state counters to a "Switching Counter" $C_{ES,SW}$ and a "Double-talk Counter" $C_{ES,DT}$, depending upon the "Switching Time" $\tau_{SW}$ and the "Double-talk Time" $\tau_{DT}$, respectively. Both $C_{ES,SW}$ and $C_{ES,DT}$ depend upon the sampling frequency $f_e$ and the frame size, N; namely, $$C_{ES,SW} = \text{round}\{\tau_{SW} f_e/N\}$$

$$C_{ES,DT} = \text{round}\{\tau_{DT} f_e/N\}$$

The preferred embodiment values N=160 samples, $f_e$=8000 samples/s, $\tau_{SW}$=100 ms, and $\tau_{DT}$=100 ms lead to $C_{ES,SW}$=5 and $C_{ES,DT}$=5.

The switching time, $\tau_{SW}$, is used for single-talk to single-talk transitions while the double-talk time, $\tau_{DT}$, is defined for double-talk to single-talk transitions. The time-delayed updating applies as follows:

when $d_{VAD,DL}(m)=2$ and $\max\{c_{ES,2}(m-1), c_{ES,4}(m-1)\}>0$ update $c_{ES,2}(m)=\min\{c_{ES,2}(m-1), C_{ES,DT}\}$ and $c_{ES,4}(m)=\min\{c_{ES,4}(m-1), C_{ES,SW}\}$ when $d_{VAD,UL}(m)=2$ and $\max\{c_{ES,2}(m-1), c_{ES,3}(m-1)\}>0$ update $c_{ES,2}(m)=\min\{c_{ES,2}(m-1), C_{ES,DT}+1\}$ and $c_{ES,3}(m)=\min\{c_{ES,3}(m-1), C_{ES,SW}+1\}$ The first criterion includes a transition from Double-talk state (2) or Near-end state (4) to far-end state (3), and the second criterion includes a transition from Double-talk state (2) or far-end state (3) transition to near-end state (4).

State diagram FIG. 1e illustrates a simplified version of these three types of updating with quick updating indicated by dotted arrows, time delay updating by broken arrows, and incremental updating by solid arrows.

(c) Gain (Attenuation) Computation.

Compute the overall downlink and uplink gains (attenuations) $g_{ES,DL}(m)$ and $g_{ES,UL}(m)$, which are applied in amplifiers $A_R$ and $A_S$, respectively, using downlink and uplink "Desired Attenuations" for the four states, $a_{DL,1}$, $a_{DL,2}$, $a_{DL,3}$, $a_{DL,4}$ and $a_{UL,1}$, $a_{UL,2}$, $a_{UL,3}$, $a_{UL,4}$, respectively, together with the four counters $c_{ESj}(m)$ from the previous subsections as:

$$g_{ES,DL}(m) = \Sigma_{1 \leq j \leq 4}\, c_{ESj}(m) a_{DLj} / \Sigma_{1 \leq j \leq 4}\, c_{ESj}(m)$$

$$g_{ES,UL}(m) = \Sigma_{1 \leq j \leq 4}\, c_{ESj}(m) a_{ULj} / \Sigma_{1 \leq j \leq 4}\, c_{ESj}(m)$$

To prevent signal discontinuities, the attenuation level is linearly interpolated between the previous and the current frame in the time domain. The first $P_{ES}$ samples (typically 16 samples) of the current frame (typically 160 samples) are interpolated to make the transition, thus define the interpolation slopes for the mth frame:

$$\Delta g_{ES,DL}(m) = (g_{ES,DL}(m) - g_{ES,DL}(m-1))/P_{ES}$$

$$\Delta g_{ES,UL}(m) = (g_{ES,UL}(m) - g_{ES,UL}(m-1))/P_{ES}$$

Then the downlink amplification (attenuation) for the mth frame is:

$$x(mN - N + j) = (g_{ES,DL}(m-1) + j\Delta g_{ES,DL}(m))r(mN - N + j)$$

$$\text{for } 1 \leq j \leq P_{ES}$$

$$= g_{ES,DL}(m))r(mN - N + j) \text{ for } P_{ES} + 1 \leq j \leq N$$

and the uplink amplification for the mth frame (without comfort noise) is:

$$s(mN - N + j) = (g_{ES,UL}(m-1) + j\Delta g_{ES,UL}(m))e(mN - N + j)$$

$$\text{for } 1 \leq j \leq P_{ES}$$

$$= g_{ES,UL}(m))e(mN - N + j) \text{ for } P_{ES} + 1 \leq j \leq N$$

These amplifications are illustrated as amplifiers $A_R$ and $A_S$ in FIGS. 2a-2b.

The preferred embodiment desired attenuations, $a_{DLj}$ and $a_{ULj}$, in the tables below provide the following attenuations recommended by the ITU-T Recommendation P.340 "Transmission Characteristics and Speech Quality Parameters of Hands-free Terminals" (May 2000) with Behavior 1 being full-duplex, Behaviors 2a-2c various partial-duplex, and Behavior 3 half-duplex. The right-hand column is for far-end talk only and the other columns for double-talk:

|  | Double-talk | | | | Far-end talk |
|---|---|---|---|---|---|
|  | $g_{ES,UL}$ | $g_{ES,DL}$ | Total TCL | AEC TCL | $g_{ES,UL}$ |
| Behavior 1 | ≦3 dB | ≦3 dB | ≧37 dB | 31 dB | 15 dB |
| Behavior 2a | 3-6 | 3-5 | 33-37 | 22 | 24 |
| Behavior 2b | 6-9 | 5-8 | 27-33 | 10 | 36 |
| Behavior 2c | 9-12 | 8-10 | 21-27 | 0 | 46 |
| Behavior 3 | >12 | >10 | <21 | n/a | n/a |

The preferred embodiment desired attenuations for downlink and uplink are:

|  | Idle $a_{DL,1}$ | Double-talk $a_{DL,2}$ | Far-end $a_{DL,3}$ | Near-end $a_{DL,4}$ |
|---|---|---|---|---|
| Behavior 1 | 3 dB | 3 dB | 0 dB | 3 dB |
| Behavior 2a | 3 | 5 | 0 | 5 |
| Behavior 2b | 3 | 8 | 0 | 8 |
| Behavior 2c | 3 | 10 | 0 | 10 |
| Behavior 3 | 3 | 10 | 0 | 10 | and

|  | Idle $a_{UL,1}$ | Double-talk $a_{UL,2}$ | Far-end $a_{UL,3}$ | Near-end $a_{UL,4}$ |
|---|---|---|---|---|
| Behavior 1 | 3 dB | 3 dB | 15 dB | 0 dB |
| Behavior 2a | 3 | 6 | 24 | 0 |
| Behavior 2b | 3 | 9 | 36 | 0 |
| Behavior 2c | 3 | 12 | 48 | 0 |
| Behavior 3 | 12 | 12 | 48 | 0 |

As a simplified (ignoring interpolations) example of the time-delay counter updating, presume a double-talk state (2) has persisted for several frames and thus the counters have saturated: $c_{ES,2}(m-1) = C_{ES,MAX}(=15)$ and $c_{ESj}(m-1)=0$ for $j \neq 2$. The consequent full-duplex attenuations are $g_{ES,UL} = a_{UL,2} = 3$ dB (=0.5) and $g_{ES,DL} = a_{UL,2} = 3$ dB (=0.5). Now presume the near-end talk disappears for several frames but the far-end talk continues, starting in frame m. Then frame m is the transition from double-talk state (2) to far-end state (3) which has desired attenuations $a_{UL,3} = 15$ dB (=0.032) and $a_{DL,3} = 0$ dB (=1.0). Presuming the far-end talk is strong (i.e., $d_{VAD,DL}(m)=2$), the counter updating for the transition would be (using $C_{ES,DT} = C_{ES,SW} = 5$):

$c_{ES,1}(m) = c_{ES,1}(m-1) - 1 = 0$    (decrement saturation)
$c_{ES,2}(m) = \min\{c_{ES,2}(m-1), C_{ES,DT}\} = C_{ES,DT} = 5$
$c_{ES,3}(m) = c_{ES,3}(m-1) + 1 = 1$    (increment)
$c_{ES,4}(m) = \min\{c_{ES,4}(m-1), C_{ES,SW}\} = 0$ with consequent attenuations $g_{ES,UL} = \tfrac{5}{6} a_{UL,2} + \tfrac{1}{6} a_{UL,3} = 3.75$ dB (=0.422) and $g_{ES,DL} = \tfrac{5}{6} a_{DL,2} + \tfrac{1}{6} a_{DL,3} = 2.34$ dB (=0.583). Note that these first-transition-frame attenuations are closer to the prior frame desired double-talk attenuations than the current frame far-end talk desired attenuations.

The next few frames, m+1, m+2, m+3, . . . , remain in state (3), so there are no state transitions and the increment/decrement counter updates apply. In particular:

$c_{ES,1}(m+1) = c_{ES,1}(m) - 1 = 0$ (decrement saturation)
$c_{ES,2}(m+1) = c_{ES,2}(m) - 1 = 4$
$c_{ES,3}(m+1) = c_{ES,3}(m) + 1 = 2$
$c_{ES,4}(m) = c_{ES,4}(m-1) - 1 = 0$ (decrement saturation)

with consequent attenuations $g_{ES,UL}=\frac{4}{6}a_{UL,2}+\frac{2}{6}a_{UL,3}=7.27$ dB (=0.188) and $g_{ES,DL}=\frac{4}{6}a_{DL,2}+\frac{2}{6}a_{DL,3}=1.76$ dB (=0.667).

Successive frames remaining in far-end talk state (3) continue incrementing the counter $c_{ES,3}(.)$ and decrementing the counter $c_{ES,2}(.)$ until after 5 frames $c_{ES,2}(.)$ has saturated at 0. At this point the attenuations are $g_{ES,UL}=a_{UL,3}=15$ dB and $g_{ES,DL}=a_{DL,3}=0$ dB, the desired attenuations for far-end talk state (3). Note that $c_{ES,3}(.)$ continues incrementing until it saturates at $C_{ES,MAX}=15$.

6. Echo Suppression Enhancements

The ES system has preferred embodiments which include one or more additional features: noise floor adjustment (NFA), attenuation level smoothing (ALS), and/or comfort noise generation (CNG). The NFA and the ALS features are computed before the linear gain interpolation while the CNG is applied after.

NFA: The noise floor adjustment avoids excessive attenuation of idle channel noise, the attenuation level in the uplink direction is bounded depending upon the near-end noise level. The NFA uses the signal-to-noise ratio (SNR) estimate in the uplink through the power estimates provided by the uplink VAD:

$SNR_{e,w}(m)=10 \log_{10}\{p_e(m)/p_w(m)\}$

The noise floor margin, $\alpha_{ES}(m)$, is determined with the near-end VAD decision according to the rules:

$\alpha_{ES}(m) = -20\log_{10}\{\alpha_{UL,1}\} + 100$ dB if $d_{VAD,UL}(m) = 2$
$= -20\log_{10}\{\alpha_{UL,1}\} + 6$ dB if $d_{VAD,UL}(m) = 1$
$= -20\log_{10}\{\alpha_{UL,1}\} + 3$ dB if $d_{VAD,UL}(m) = 0$ The adjusted linear attenuation in uplink, $\breve{g}_{ES,UL}(m)$, is computed from:

$-20 \log_{10}\{\breve{g}_{ES,UL}(m)\}=SNR_{e,w}(m)+\alpha_{ES}(m)$

The final value of the linear attenuation is limited above the noise floor using the estimated SNR:

$g_{ES,UL}(m)=\max\{g_{ES,UL}(m), \breve{g}_{ES,UL}(m)\}$

ALS: Attenuation level smoothing provides smooth gain evolution (i.e., at state transitions) by an exponential averaging method in an iterative form using a forgetting factor, $\lambda_{ALS}$:

$\tilde{g}_{ES,UL}(m)=\lambda_{ALS}\tilde{g}_{ES,UL}(m-1)+(1-\lambda_{ALS})g_{ES,UL}(m)$ CNG: Comfort noise generation is added to the ES output signal to mask excessive attenuation that can introduce noise level fluctuations. Comfort noise is generated by low apss filtering a scaled random noise. The preferred embodiment low pass filter is a second-order infinite impulse response (IIR) filter with a cut-off frequency of $f_c=1000$ Hz; that is, the transfer function is:

$H(z)=\epsilon_H/[1-2\alpha_H \cos(2\pi f_c/f_e)z^{-1}+\alpha_H^2 z^{-2}]$ with the parameters $\epsilon_H=0.8$ and $\alpha_H=0.5$, and the sampling frequency $f_e=8000$ Hz. The noise scaling factor, $\alpha_w(m)$, is computed using the noise power estimation, $p_w(m)$, from the uplink VAD and the desired attenuation on the uplink side in idle state, $a_{UL,1}$, from the echo suppression parameters:

$20 \log_{10}\{\alpha_w(m)\}=\sqrt{(p_w(m)-(A_{UL,1}+6))}$ where $A_{UL,1}=20 \log_{10}\{a_{UL,1}\}$. The random number generation may be by any convenient method.

7. Modifications

The preferred embodiments may be modified while retaining one or more of the features of asymmetrical adaptation of noise and/or speech power estimates, optimal stepsize, spectrally smoothed adaptation, stepsize control, proportional subfilter adaptation, and/or multiple state counters for attenuation combinations.

For example, the various thresholds, limits, and adaptation factors could each have different values; the linear combination of desired attenuations using the counters could be in terms of the attenuations expressed in dB, or nonlinear combinations used; the AGC could saturate the square root of the ratio of the target speech power divided by the estimated speech power to determine the gain, and so forth.

What is claimed is:

1. A process of echo suppression, comprising:
   A. updating, for every received and sent frame of voice data, and in a range of zero to a maximum value:
      i. a count in a first hangover counter for an Idle operating state,
      ii. a count in a second hangover counter for an Double-talk operating state,
      ii. a count in a third hangover counter for an Far-end talk only operating state,
      iv. a count in a fourth hangover counter for an Near-end talk operating state, and
      v. the updating including updating the counts in the counters at a change of operating states with one of an increment/decrement updating, a quick updating, and a time-delay updating;
   B. computing each of four coefficients as the relative counts of the respective first, second, third, and fourth hangover counters;
   C. computing attenuations for a receive amplifier and a send amplifier as linear combinations of the four coefficients;
   D. attenuating amplification of a received frame of voice data to be applied to a speaker, and attenuating amplification of a sent frame of voice data from a microphone to suppress echoes.

2. The process of claim 1 in which the increment/decrement updating includes incrementing by one the counter corresponding to the changed operating state while decrementing by one the counters corresponding to the other three states, with saturation of the counters at both zero and a maximum.

3. The process of claim 1 in which the quick updating includes resetting all counters to zero except the counter corresponding to the changed operating state without a time delay.

4. The process of claim 1 including using only the quick updating for transitions from the Idle operating state to the Double-talk operating state, the Far-end operating state, and the Near-end operating state, and for transitions from the Far-end operating state and Near-end operating state to the Double-talk operating state.

5. The process of claim 1 in which the time-delay updating includes resetting all counters to zero, except the counter corresponding to the different operating state, with a time delay.

6. The process of claim 1 including using only the time delay updating with one time delay for transitions between the Far-end operating state and the Near-end operating state.

7. The process of claim 1 including using only the time delay updating with one time delay for transitions from the Double-talk operating state to the Far-end operating state and the Near-end operating state.

8. The process of claim 1 including using only the time delay updating with one time delay for transitions between the Far-end operating state and the Near-end operating state and with another time delay for transitions between the Far-end operating state and the Near-end operating state.

* * * * *

UNITED STATES PATENT AND TRADEMARK OFFICE
CERTIFICATE OF CORRECTION

PATENT NO. : 7,643,630 B2  
APPLICATION NO. : 11/165897  
DATED : January 5, 2010  
INVENTOR(S) : McCree et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Twenty-first Day of December, 2010

David J. Kappos  
*Director of the United States Patent and Trademark Office*